(12) United States Patent
Hasegawa et al.

(10) Patent No.: US 12,099,273 B2
(45) Date of Patent: *Sep. 24, 2024

(54) LIGHTING DEVICE WITH LED FACING A DISC SHAPED LIGHT GUIDE

(71) Applicant: Japan Display Inc., Tokyo (JP)

(72) Inventors: Makoto Hasegawa, Tokyo (JP); Nobuyuki Suzuki, Tokyo (JP); Masafumi Okada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,963

(22) Filed: Jun. 9, 2023

(65) Prior Publication Data

US 2023/0314869 A1    Oct. 5, 2023

Related U.S. Application Data

(63) Continuation of application No. 17/954,331, filed on Sep. 28, 2022, now Pat. No. 11,703,710, which is a (Continued)

(30) Foreign Application Priority Data

Apr. 3, 2020  (JP) ................. 2020-067324

(51) Int. Cl.
*G02F 1/13357*   (2006.01)
*F21S 2/00*   (2016.01)
(Continued)

(52) U.S. Cl.
CPC .............. *G02F 1/1336* (2013.01); *F21S 2/00* (2013.01); *G02F 1/1337* (2013.01); *G02F 1/134309* (2013.01); *F21Y 2115/10* (2016.08)

(58) Field of Classification Search
CPC .................. G02F 1/1336; G02F 1/1337; G02F 1/134309; F21S 2/00; F21Y 2115/10
See application file for complete search history.

(56) References Cited

U.S. PATENT DOCUMENTS 11,294,223 B2 * 4/2022 Hasegawa ............... F21V 5/005
11,537,001 B2 * 12/2022 Hasegawa ............ F21V 14/003
(Continued)

FOREIGN PATENT DOCUMENTS

JP   2004184947 A  *  7/2004
JP   2011159435 A  *  8/2011   ............... F21K 9/20

OTHER PUBLICATIONS

Ueno, JP2004184947A, machine translation _2004 (Year: 2004).*
Koyama et al. JP2011159435A, machine translation Aug. 2011 (Year: 2011).*

*Primary Examiner* — Tracie Y Green
(74) *Attorney, Agent, or Firm* — XSENSUS LLP

(57) ABSTRACT

The purpose of the present invention is to realize a lighting device of thin, low power consumption and high emitting efficiency. A concrete structure of the inventions is as follows. A lighting device including a first light guide and a second light guide stacked on the first light guide, a reflecting sheet disposed under the first light guide, and a prism sheet disposed on the first light guide, in which a concentric first prism array is formed on the prism sheet, a plurality of first LEDs are disposed along a circumferential direction of a side wall of a first hole of the first light guide, a plurality of second LEDs are disposed along a circumferential direction of a side wall of a second hole of the second light guide, and the plurality of the first LEDs and the plurality of the second LEDs are displaced in azimuth direction.

5 Claims, 39 Drawing Sheets

Related U.S. Application Data continuation of application No. PCT/JP2021/003749, filed on Feb. 2, 2021.

(51) Int. Cl.
    *G02F 1/1337*     (2006.01)
    *G02F 1/1343*     (2006.01)
    *F21Y 115/10*     (2016.01)

(56) References Cited

U.S. PATENT DOCUMENTS

| | | | |
|---|---|---|---|
| 11,703,710 B2 * | 7/2023 | Hasegawa | F21S 2/00 349/62 |
| 2011/0019421 A1 * | 1/2011 | Lai | F21K 9/27 362/249.02 |
| 2018/0259701 A1 * | 9/2018 | Yuki | G02F 1/133308 |
| 2020/0326470 A1 * | 10/2020 | Kyoukane | G02B 6/0055 |
| 2021/0054994 A1 * | 2/2021 | Qui | F21S 8/04 |

* cited by examiner

| madel | specification | luminous flux /LED | necessary numbers of LED | power consumption (w)/LED | total power consumption (w) | calorific value (Kcal) |
|---|---|---|---|---|---|---|
| comparison | one LED | 1.070 | 1 | 8.996 | 8.996 | 7.737 |
| (1) | plural LEDs | 18 | 59 | 113 | 6.717 | 5.777 |
| (2) | plural LEDs | 100 | 11 | 732 | 7.832 | 6.736 |
| (3) | plural LEDs | 33 | 32 | 236 | 7.652 | 6.581 |
| (4) | plural LEDs | 35 | 39 | 140 | 7.443 | 6.401 |

K-K

V5 > V4 > V3 > V2 > V1

K-K

E-E

F-F

LIGHTING DEVICE WITH LED FACING A DISC SHAPED LIGHT GUIDE

CROSS-REFERENCE TO RELATED APPLICATIONS

The present application is a continuation application of Ser. No. 17/954,331, filed Sep. 28, 2022, which is a continuation application of International Application No. PCT/JP2021/003749, filed on Feb. 2, 2021, which claims priority to Japanese Patent Application No. 2020-067324, filed on Apr. 3, 2020. The contents of these applications are incorporated herein by reference in their entirety.

BACKGROUND OF THE INVENTION (1) Field of the Invention

The present invention relates to a lighting device of thin, small light distribution angle, and less power consumption.

(2) Description of the Related Art

Light emitting diodes (LEDs) are being used for the lighting device. Light emitting diodes have high luminous efficiency, and thus profitable for low power consumption. The light emitting diode, however, is a point light source; it must be transformed to the surface light source if it is used as the lighting device.

Patent document 1 discloses a lighting device having a flat emitting surface, in which the light emitted from the LED, disposed on the side wall of the lighting device, is reflected at the reflective back surface having a certain angle to the flat emitting surface, and is mitted from the emitting surface.

Patent document 2 discloses a lighting device, in which the light from the LED is emitted through a collimator lens; and a liquid crystal lens, which is disposed at the emitting surface, transmits, diffuses, or deflects the emitting light.

Patent document 3 discloses to use a liquid crystal lens to control the shape of the light beam.

PRIOR TECHNICAL DOCUMENT

Patent Document

Patent document 1: WO 2013-080903
Patent document 2: Japanese patent application laid open No. 2019-169435
Patent document 3: US 2019/0025657 A1

SUMMARY OF THE INVENTION

The lighting device needs to have a small light distribution angle when it is used as e.g. a spot light. Conventionally, for such a lighting device, a parabolic mirror has been used to form a parallel light. However, a certain depth is necessary in such a lighting device; therefore, it is difficult to attain a small lighting device or a thin lighting device.

In addition, since a light emitting efficiency of the LED decreases when the LED becomes high temperature, the LED is preferable to be a low heat generating light source, namely, low power consuming light source as a whole. Besides, if heat generation from the light source is less, it becomes not necessary to provide a heat sink and so forth.

The purpose of the present invention is to realize a lighting device of thin, comparatively less power consumption, and small light distribution angle.

The present invention solves the above explained problems; concrete structures are as follows.

(1) A lighting device including: a first light guide having a first major surface and a first back surface and a first hole at a first center, a second light guide, disposed on the first light guide, having a second major surface and a second back surface and a second hole at a second center, a reflecting sheet disposed under the first back surface of the first light guide, and a prism sheet disposed on the second major surface of the first light guide; in which a concentric first prism array is formed on the prism sheet, a plurality of first LEDs are disposed along a circumferential direction of a side wall of the first hole of the first light guide, a plurality of second LEDs are disposed along a circumferential direction of a side wall of the second hole of the second light guide, and the plurality of the first LEDs and the plurality of the second LEDs are displaced in azimuth direction.

(2) The lighting device according to (1), in which a second prism array, extending radially in radial direction and arranged in circumferential direction, is formed on the major surface of the first light guide, a third prism array, formed concentrically, is formed on the back surface of the first light guide, a fourth prism array, extending radially in radial direction and arranged in circumferential direction, is formed on the major surface of the second light guide, and a fifth prism array, formed concentrically, is formed on the back surface of the second light guide.

(3) The lighting device according to (1), in which the first light guide has a fan like first region, which opposes to the plurality of the first LEDs, and a fan like second region, which does not oppose to the plurality of the first LEDs, the second prism array and the third prism array are not formed in the first region, and are not formed in the second region; the second light guide has a fan like third region, which opposes to the plurality of the second LEDs, and a fan like fourth region, which does not oppose to the plurality of the second LEDs, and the fourth prism array and the fifth prism array are not formed in the third region, and are not formed in the fourth region.

(4) The lighting device according to (3), in which the first region of the first light guide and the fourth region of the second light guide overlap in a plan view.

(5) The lighting device according to (1), in which a first liquid crystal lens having a plurality of lenses extending in a first direction and arranged in a second direction is disposed on the prism sheet.

(6) The lighting device according to (5), in which a second liquid crystal lens having a plurality of lenses extending in a second direction and arranged in a first direction is disposed on the first liquid crystal lens.

(7) The lighting device according to (6), in which initial alignments of the liquid crystal molecules are homogeneous in the first liquid crystal lens and the second liquid crystal lens.

(8) The lighting device according to (1), in which a liquid crystal lens having a plurality of concentric lenses is disposed on the prism sheet, and initial alignments of the liquid crystal molecules are homeotropic.

(9) The lighting device according to (1), in which a liquid crystal lens, having a first substrate and a second substrate, a liquid crystal layer being sandwiched between the first substrate and the second substrate, is disposed on the prism sheet, a first concentric electrodes are formed on the first substrate, a planer circular electrode is formed on the second substrate, a lens effect is formed by applying different voltages to the plurality of first electrodes, and initial alignments of the liquid crystal molecules of the liquid crystal layer are homeotropic.

BRIEF DESCRIPTION OF THE DRAWINGS

FIG. 18 is a table comparing characteristics of various lighting devices using LEDs;

DETAILED DESCRIPTION OF THE PREFERRED EMBODIMENTS

Figure 1:
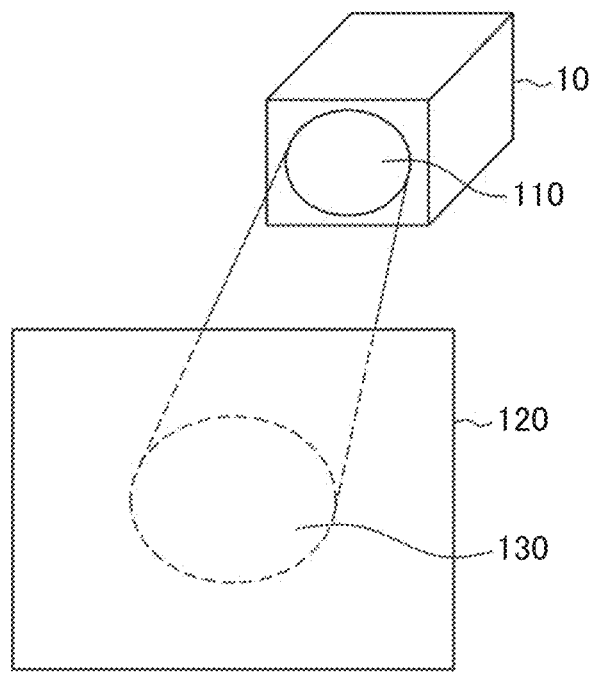
FIG. 1 is a perspective view of a lighting device.

FIG. 1 is an example of the lighting device 10, which is used for a spot light. The light from the lighting device 10 is collimated; a spot light 130 is emitted from the emitting surface 110, and applied to an incident surface 120. The light distribution angle is controlled as e.g. 12 degrees to acquire a spot light 130.

Figure 2:
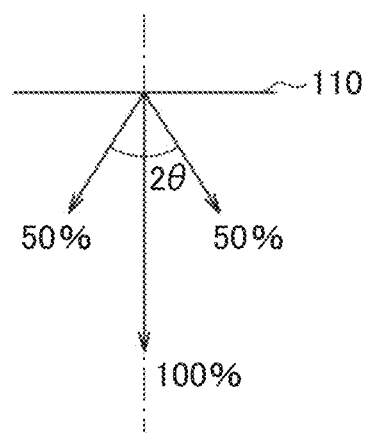
FIG. 2 is a definition of the light distribution angle.

FIG. 2 defines the light distribution angle. FIG. 2 shows e.g. that a spot light is applied to the floor from a light emitting surface 110 disposed on the ceiling. The light intensity is largest at the normal direction to the light emitting surface 110; the light intensity decreases according to the polar angle becoming larger. The light distribution angle is defined as 2θ provided the intensity along the normal direction is 100%, and the intensity along the polar angle θ is 50%. In normally collimated light, the light distribution angle is required as 12 degrees or less.

Figure 3:
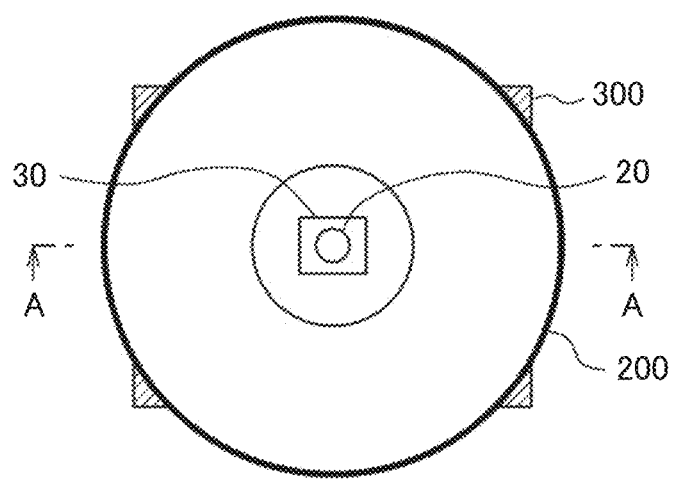
FIG. 3 is a plan view of the lighting device, which collimates light with a parabolic mirror.
Figure 4:
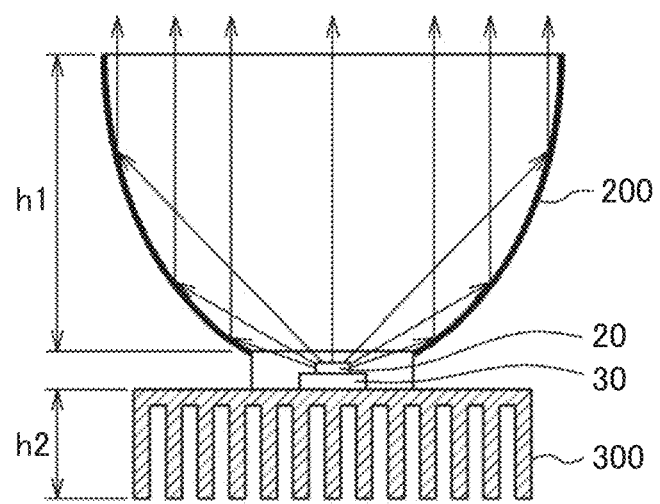
FIG. 4 is a cross sectional view of FIG. 3 along the line A-A.

Conventionally, a parabolic mirror 200 has been used to acquire such a collimated light. FIG. 3 is a plan view of the lighting device using a parabolic mirror 200; FIG. 4 is a cross sectional view of the lighting device of FIG. 3. In FIG. 3, an LED 20 is set at the center of the parabolic mirror 200. The LED 20 is set e.g. on a PCB substrate 30. The LED 20 is a high brightness LED, which becomes high temperature; thus, the LED 20 is set on a heat sink 300. A part of the heat sink 300, which is set at the rear of the parabolic mirror 200, is visible in FIG. 3.

FIG. 4 is a cross sectional view of FIG. 3 along the line A-A. In FIG. 4, the LED 20 is disposed at the bottom surface of the parabolic mirror 200. The lights emitted from the LED 20, except the light emitted in the optical axis direction, reflect at the parabolic mirror and become parallel to the optical axis. The parabolic mirror 200, however, needs to be as high as h1 for enough collimating function. The height h1 of the parabolic mirror 200 needs to be about 60 mm to acquire the light distribution angle of about 12 degrees. Actually, since the height h2 of the heat sink 300 is added, the total height of the lighting device becomes 80 mm or more. In the meantime, in the lighting device of FIGS. 3 and 4, one LED, which constitutes the light source, needs to be supplied with a large power; consequently, the heat generation in the LED becomes large, thus, the heat sink is indispensable.

The purpose of the present invention is to realize the lighting device, which can emit collimated light, of thin and comparatively low power consumption. The present invention is explained by the following embodiments.

Embodiment 1

Figure 5:
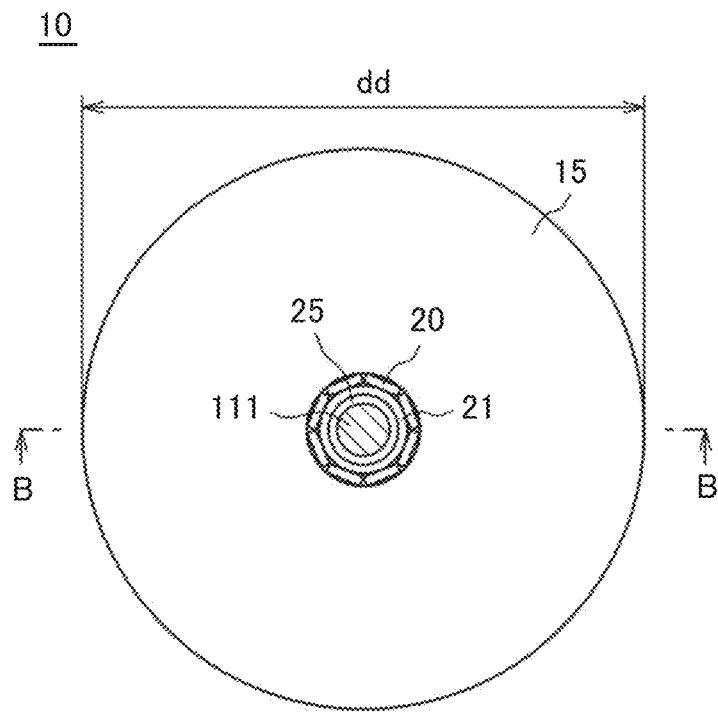
FIG. 5 is a plan view of the lighting device according to embodiment 1.
Figure 6:
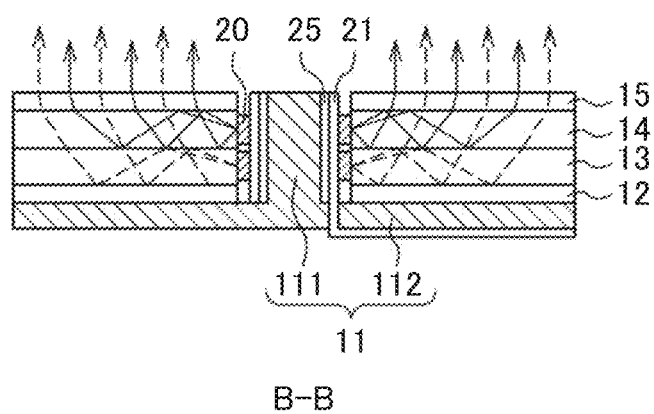
FIG. 6 is a cross sectional view of FIG. 5 along the line B-B.

FIG. 5 is a plan view of the lighting device 10 according to embodiment 1; FIG. 6 is a cross sectional view of FIG. 5 along the line B-B. As depicted in FIG. 5, a plan view of the lighting device is circular; and a prism sheet 14 is disposed at the upper most surface of the lighting device. Each of the optical components is disc shaped, and is inserted in an axis 111 of a metal frame 11, which has a central axis 111 and a circular flange 112. A flexible wiring substrate 21, on which LEDs are installed, is disposed to surround the axis 111 of the frame 11; the flexible wiring substrate 21 is adhered to the axis 111 of the frame 11 through a heat conductive sheet 25. The heat generated by the LED 20 conducts to the axis 111 of the frame 11 through the heat conductive sheet 25, and is dissipated into the flange 112 of the frame 11. An outer size dd of the lighting device 10 is e.g. 98 mm.

FIG. 6 is a cross sectional view of FIG. 5 along the line B-B. In FIG. 6, a reflecting sheet 12, a bottom light guide 13, a top light guide 14, and a prism sheet 15 are superposed in this order on the flange 112 of the frame 11 formed from metal. Each of those optical components has a hole at the center to be adapted to the axis 111 of the frame 11. The flexible wiring substrate 21, on which LEDs are installed, is adhered surrounding the axis 111 of the frame 11. A part of the flexible wiring substrates 21 extends to back of the flange 112 of the frame 11 through a cut out formed in the flange 112 of the frame 11. The flexible wiring substrate 21 and the axis 111 of the frame 11 are adhered to each other by the heat conductive tape 25, which has a superior heat conductivity.

In FIG. 6, the reflection sheet 12 is set on the flange 112. An ESR (Enhanced Specular Reflector) of 3M Company, for example, can be used as the reflection sheet 12; a thickness is e.g. 70 micron. One of the features of the present invention is to dispose the bottom light guide 13 and the top light guide 14 on the reflecting sheet 12. The LEDs 20 are disposed corresponding to the inner side surfaces of the light guides 13 and 14.

The arrows show light passes of the light emitted from each of the LEDs 20. The light entered in the top light guide 14 and in the bottom light guide 13 repeats reflections, and eventually goes upper direction, namely, to the emitting surface. In FIG. 6, since the light reflects also at an interface between the top light guide 14 and the bottom light guide 13, the light can be guided to the emitting surface more efficiently than a case when there is only one light guide. Detailed explanation of the light guide is made later.

The other feature of the present invention is, as shown in FIG. 5 and FIG. 6, the plurality of LEDs 20 are disposed at inner side walls of the top light guide 14 and the bottom light guide 13; thus, temperature rise of each of the LEDs 20 are suppressed, consequently, a decrease in the light emitting efficiency is suppressed because power consumption of each of the LEDs 20 is decreased, and the temperature rise of each of the LEDs 20 is decreased. In FIG. 6, the light emitting from the major surface of the top light guide 14 is further collimated by the prism sheet 15 disposed on the top light guide 14, and is directed to align with the normal line of the emitting surface of the lighting device 10.

Figure 7:
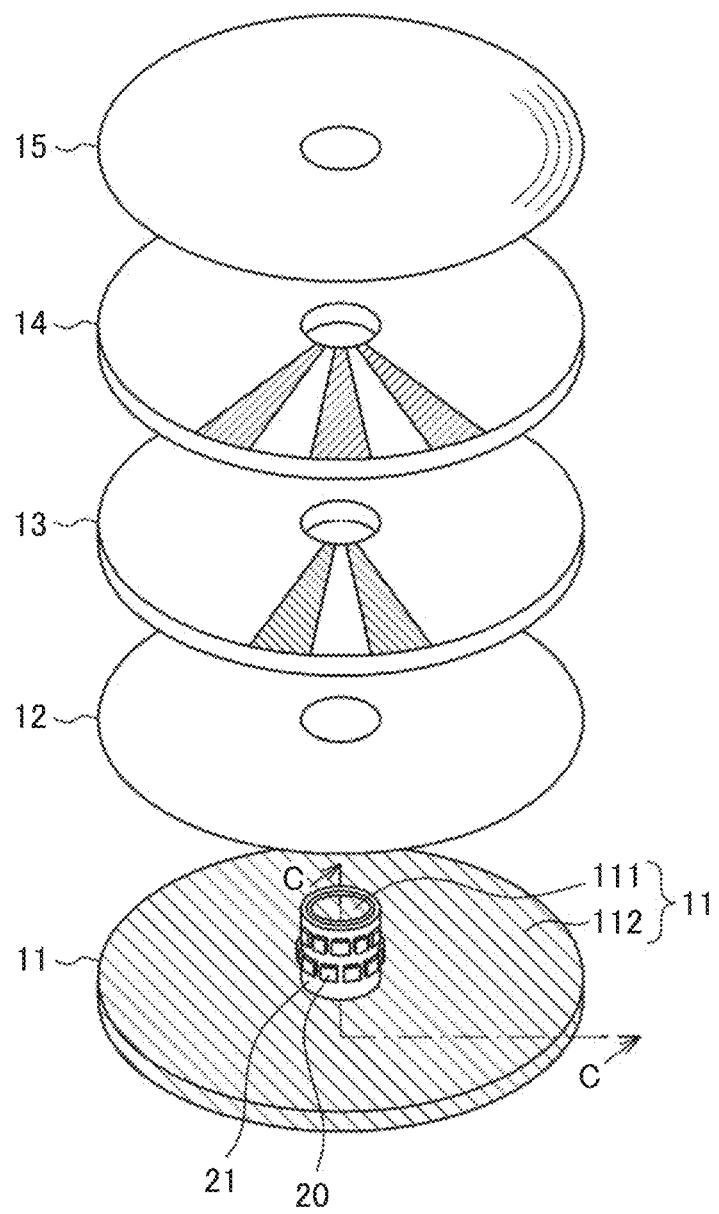
FIG. 7 is an exploded perspective view of the lighting device according to embodiment 1.
Figure 8:
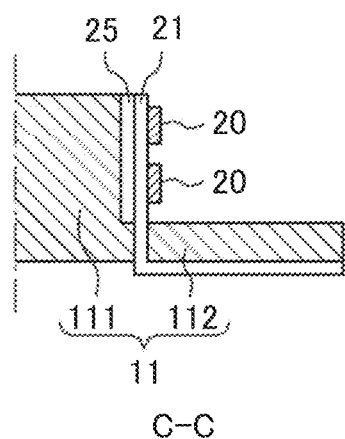
FIG. 8 is a cross sectional view of FIG. 7 along the line C-C, which is a cross sectional view at the vicinity of the axis of the frame.

FIG. 7 is an exploded perspective view of the structure of the lighting device explained in FIG. 6. The flexible wiring substrate 21, installed with LEDs 20, surrounds and is adhered to the axis 111 of the frame 11. FIG. 8 is a cross sectional view of FIG. 7 along the line C-C, which is a detailed cross sectional view at the vicinity of the axis 111 of the frame 11. The LEDs 20 are disposed in two tiers on the flexible wiring substrate 21, and are disposed to oppose to the top light guide 14 and the bottom light guide 13. The LED 20 becomes high temperature, however, the heat of the LED 20 is dissipated to the axis 111 of the frame 11, which is made of metal, through a thin flexible wiring substrate 25.

Figure 9:
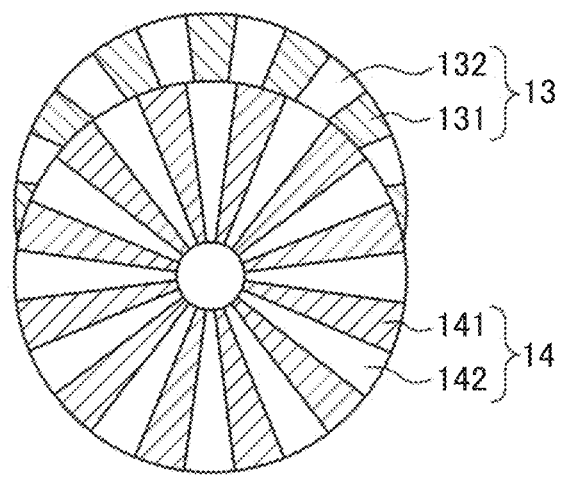
FIG. 9 is a plan view in which a first light guide and a second light guide overlap.

Back to FIG. 7, the axis 111 of the frame 11 is inserted in the holes of the reflection sheet 12, the bottom light guide 13 and the top light guide 14. FIG. 9 is a plan view of the top light guide 14 and the bottom light guide 13. Pattern areas 131 and 141, in which prism arrays are formed, and no pattern areas 132 and 142, in which prism patterns are not formed, are formed in each of the bottom light guide 13 and the top light guide 14. When the bottom light guide 13 and the top light guide 14 are superposed, the pattern area 131 of the bottom light guide 13 overlaps the no pattern area 142 of the top light guide 14; and the no patter area 132 of the bottom light guide 13 overlaps the pattern area 141 of the top light guide 14.

Figure 10A:
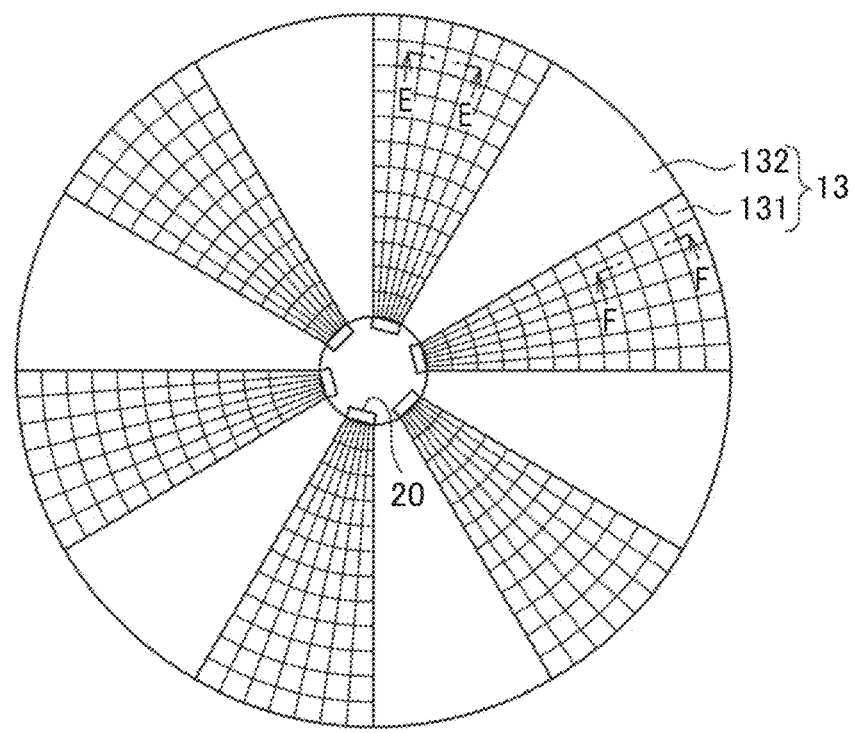
FIG. 10A is a plan view of the first light guide.

FIG. 10A is a plan view of the structure of prism array formed on the surface of bottom light guide 13. In FIG. 10A, the area 131 of prism array and the area 132 of no prism array are disposed alternatively in a circumferential direction. The prism array formed on the top surface of the bottom light guide 13 (herein after may be called as a major surface) is formed in radially in radius direction; the prism array formed on the bottom surface of the bottom light guide 13 (herein after may be called as a back surface) is formed in concentrically. The LEDs 20 are disposed at the inner wall corresponding to the region where the prism arrays are formed.

Figure 10B:
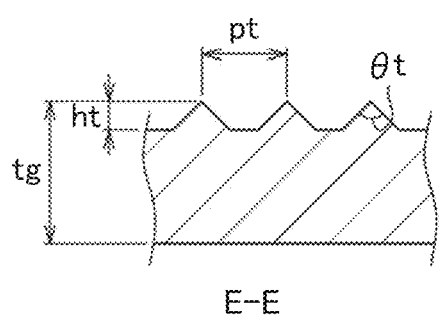
FIG. 10B is a cross sectional view of FIG. 10A along the line E-E.

FIG. 10B is a cross sectional view of FIG. 10A along the line E-E, which is a cross sectional view of the prism array formed on a surface of the major surface of the light guide 13. The prism array of the major surface is a pattern radially extending from the center; therefore, a pitch pt of the prism array changes according to the locations. A thickness tg of the light guide is e.g. 1.5 mm; a height ht of prism array is e.g. 0.1 μm; the apex angle θt is e.g. 90 degrees.

Figure 10C:
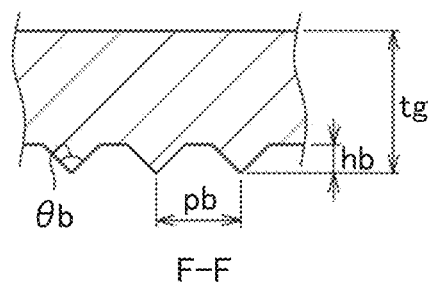
FIG. 10C is a cross sectional view of FIG. 10A along the line F-F.

FIG. 10C is a cross sectional view of FIG. 10A along the line F-F, which is a cross sectional view of the prism array formed on the back surface of the light guide 13. The prism array of the back surface is a pattern formed in concentrically. A pitch of the concentric circles is e.g. 0.1 μm; a height hb of the prism is e.g. 0.02 μm; the apex angle θb is e.g. 90 degrees. The height hb of the prism formed on the bottom surface of the prism 13 is lower than a height ht of the prism formed on the top surface of the prism 13. However, a height and a pitch of the prism array formed both surfaces of the top and the bottom of the light guide 13, are much smaller compared with a height and a pitch of the prism array formed at the surface of the prism sheet 15, which is explained later. Therefore, denser prism arrays are formed on the major surface and the back surface of the light guide 13. In the meantime, it is explained that the prism arrays formed on light guide 13 are formed by projections, however, the prism arrays formed by V shaped grooves also can perform the same effects.

The above explanation is made for the bottom light guide 13; however, the same figure can be applied to the top light guide 14. When the bottom light guide 13 and the top light guide 14 are assembled, the bottom light guide 13 and the top light guide 14 are deviated from each other in circumferential direction so that the pattern area of the top light guide 14 superposes the no pattern area of the bottom light guide 13.

Figure 11:
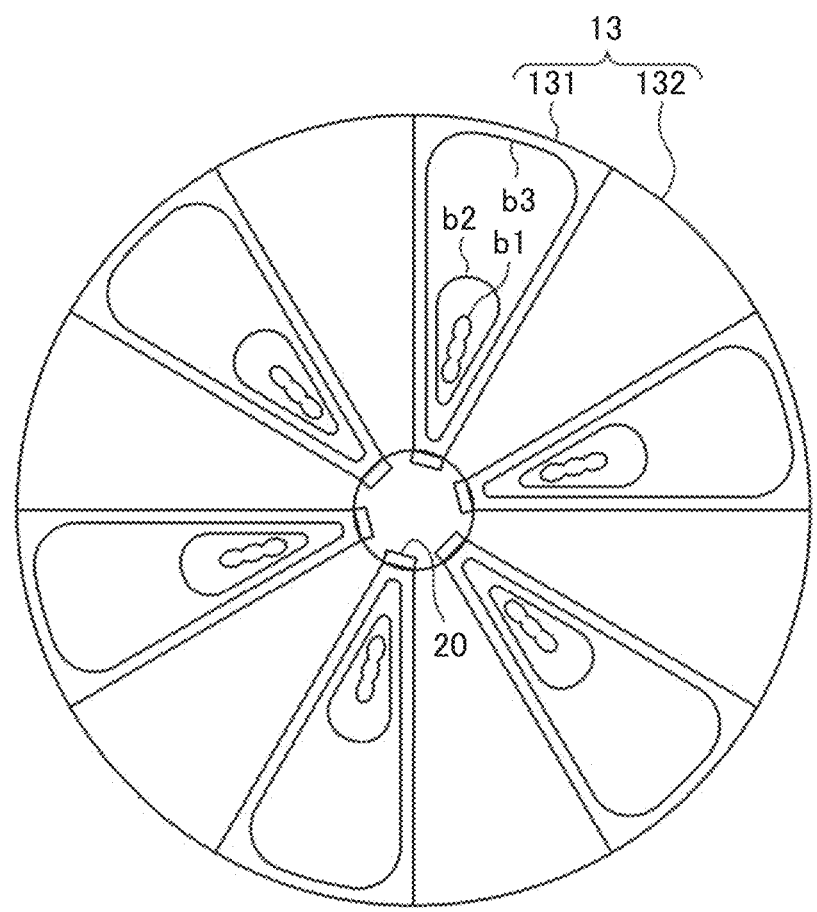
FIG. 11 is contour of brightness at the surface of the light guide.

FIG. 11 is a plan view of brightness pattern of the major surface of the light guide 13 when the LED 20, which is disposed at the inner wall of the light guide 13, is lighted on. In FIG. 11, the LED 20 is disposed corresponding to the pattern area 131 of the light guide 13. The light emitted from the LED 20 disposed at the side wall of the hole of the light guide 13 is emitted from the pattern area 131 of the major surface by the reflection sheet 12, and the prism arrays formed on the major surface and the back surface of the light guide 13.

In FIG. 11, b1, b2, and b3 are contour of the brightness; b1 is the place of brightest. The feature of FIG. 11 is that the light from the LED 20 is emitted only from the corresponding pattern area 131 of the light guide 13. That is to say, the light from the LED 20 is efficiently collected to the pattern area 131 of the major surface according to prism arrays formed on the major surface and the back surface of the light guide 13. The above behavior is the same in the top light guide 14.

Figure 12:
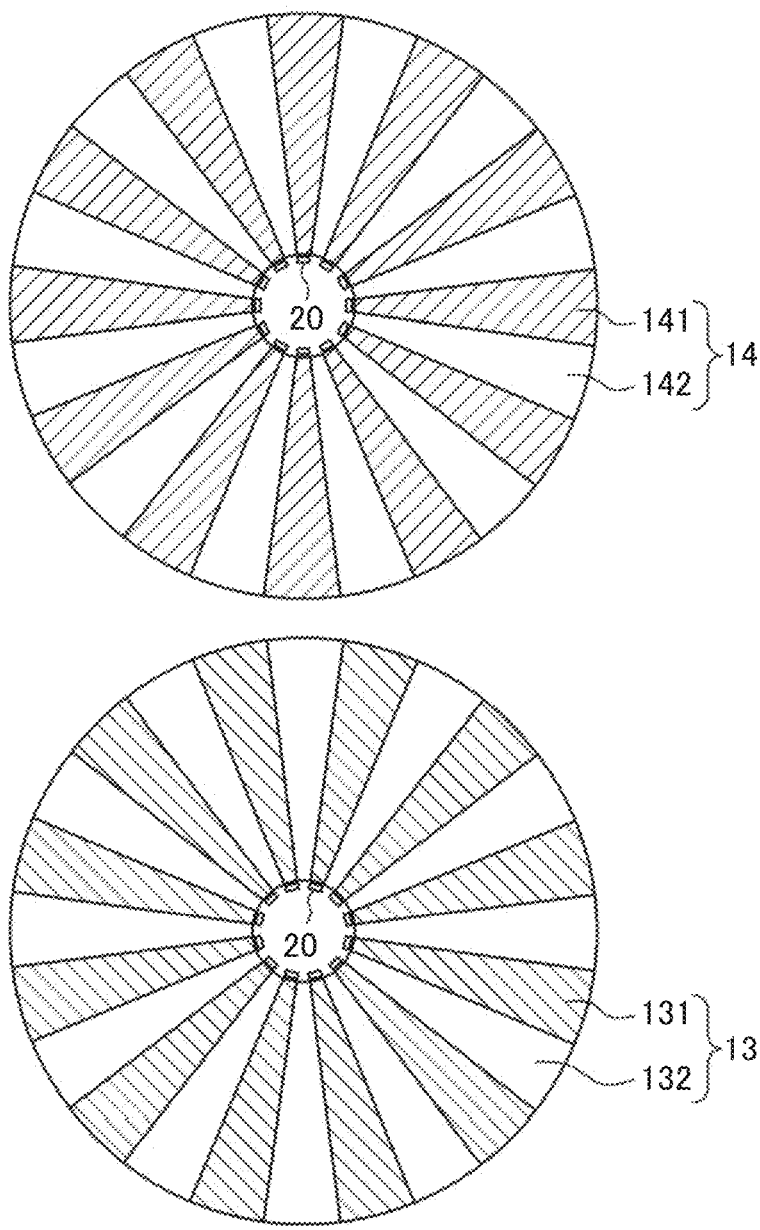
FIG. 12 is a plan view in which the first light guide and the second light guide are juxtaposed for comparison.

FIG. 12 is a plan view of brightness distributions at the major surfaces of the top light guide 14 and the bottom light guide 13 when the LEDs 20 are lighted on. In FIG. 12, the hatched parts in the top light guide 14 and the bottom light guide 13 are bright areas, namely the place where the LEDs 20 are disposed. In FIG. 12, the LEDs 20 disposed at the top light guide 14 and LEDs 20 disposed at the bottom light guide 13 are different ones.

Figure 13:
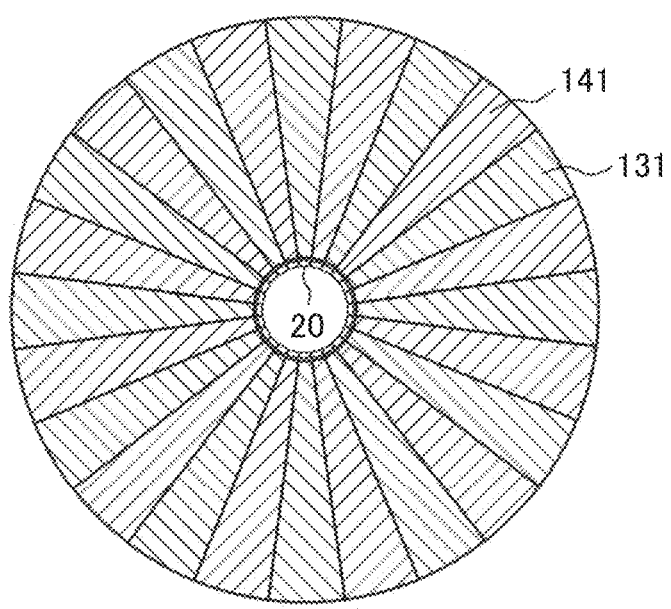
FIG. 13 is a plan view in which the first light guide and the second light guide are superposed.
Figure 14:
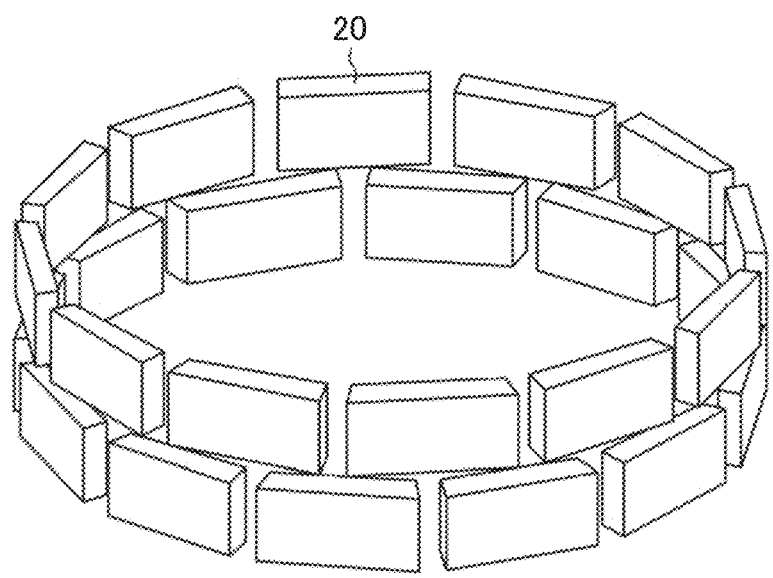
FIG. 14 is a perspective view of a disposition of LEDs.

FIG. 13 is a brightness distribution when the top light guide 14 and the bottom light guide 13 are superposed. The top light guide 14 and the bottom light guide 13 are superposed as that a bright area from which the light from the LED 20 is emitted and a dark area from which the light from the LED 20 is not emitted overlap; therefore, the light is emitted uniformly from the major surface of the light guide 14. FIG. 14 is a perspective view of the disposition of the LEDs 20, which are disposed at the inner wall of the bottom light guide 13 and the inner wall of the top light guide 14. The LEDs 20 are disposed circumferentially in an upper tier and in a lower tier; the LEDs 20 in the upper tier and the LEDs 20 in the lower tier are disposed alternative in azimuth direction. According to the above disposition, more LEDs 20 can be disposed; thus, power consumption of each of LEDs can be suppressed, and heat generation can be mitigated.

Figure 15A:
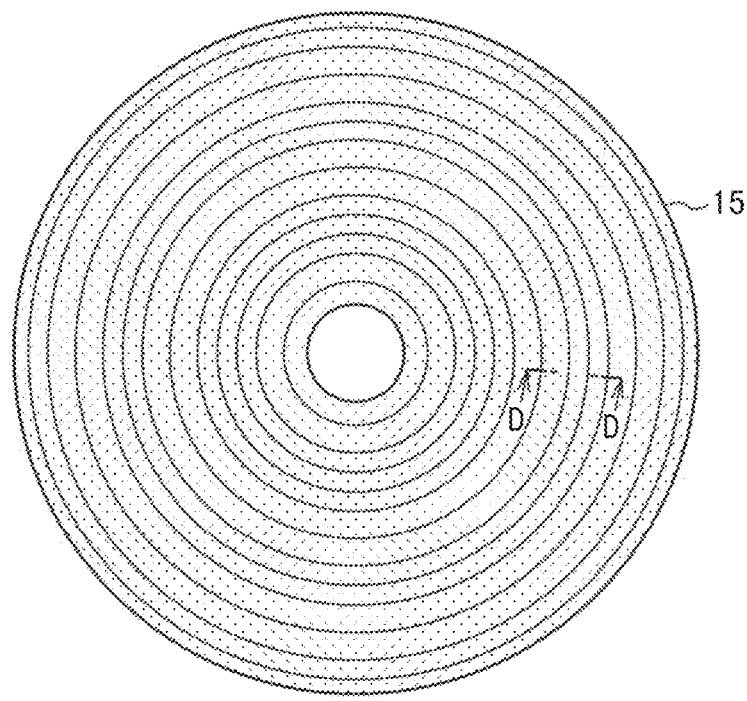
FIG. 15A is a plan view of a prism sheet.

FIG. 15A is a plan view of a prism sheet 15, which is disposed on the top light guide 14. The prism sheet 15 is a so called a reverse prism sheet, in which the prism array is formed at the surface opposing to the top light guide 14. In FIG. 15, the prism array is formed concentrically; therefore, the light emitting from the top light guide 14 is directed parallel to the normal direction of the major surface of the prism sheet 15.

Figure 15B:
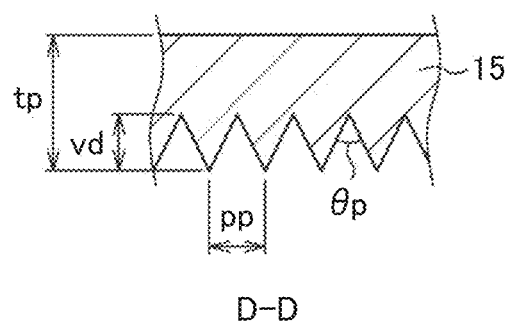
FIG. 15B is a cross sectional view of FIG. 15A along the line D-D.

FIG. 15B is a cross sectional view of FIG. 15A along the line D-D, which is a cross sectional view to show a shape of the prism array. In FIG. 15B, a thickness tp of the prism sheet 15 is e.g. 200 μm, a depth vd of the V shaped groove is 75 μm, an apex angle θp is e.g. 66 degrees, a pitch pp is e.g. 100 μm. As described above, the height and the pitch formed in the prism sheet 15 are much larger compared with the heights and the pitches of the prism arrays formed at the major surfaces and the back surfaces of the bottom light guide 13 and the top light guide 14.

Figure 16:
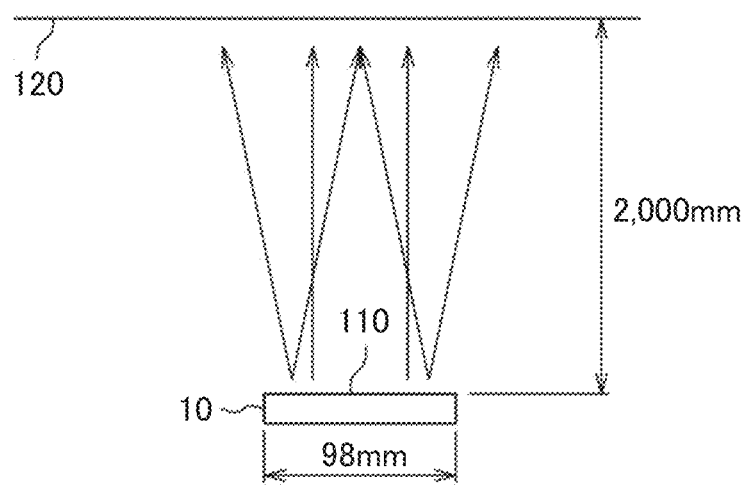
FIG. 16 is a cross sectional view which is an example of a measuring system of illuminous distribution.

In the lighting device 10 explained above has the axis 111 of the frame 11 at the center area, and the light is not emitted from this area. Therefore, the luminous distribution is measured in the structure shown in FIG. 16. FIG. 16 shows that light is projected to the ceiling 120 from the lighting device 10. A diameter of the emitting surface of the lighting device 10 is 98 mm, a distance from the emitting surface to the irradiated surface 120 is 2000 mm.

Figure 17:
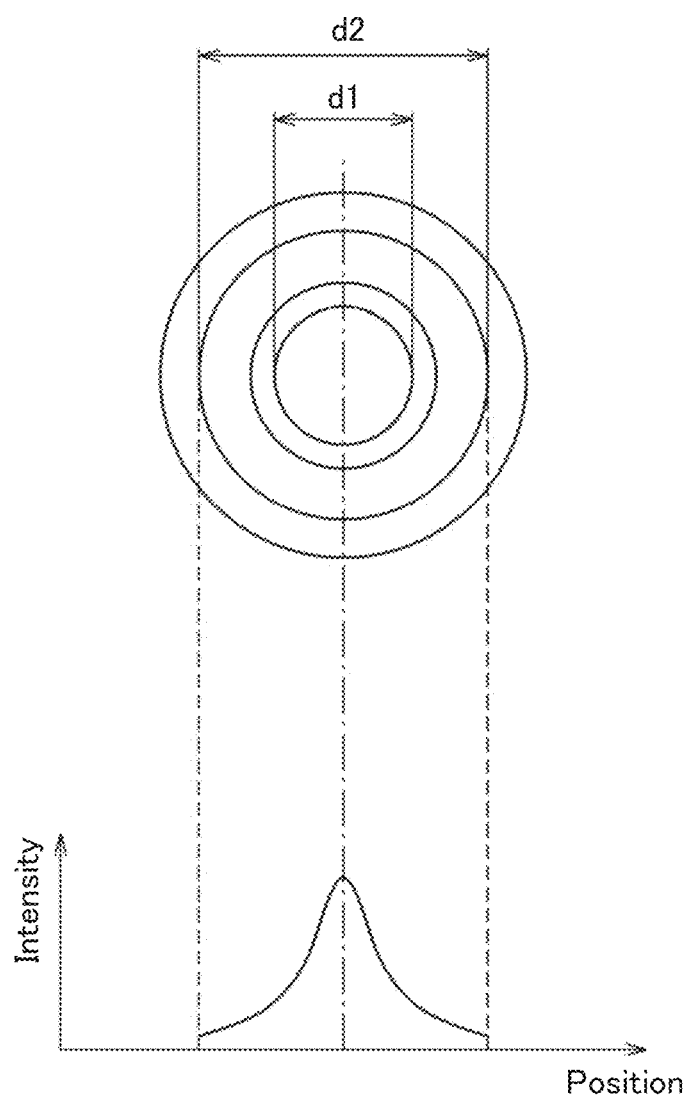
FIG. 17 is a graph which shows an example of illuminous distribution.

FIG. 17 is an illuminance distribution of the light spot. As shown in the top figure of FIG. 17, the illuminance distribution is approximately concentric; and as shown by the bottom figure of FIG. 17, the luminance intensity is approximately in a normal distribution. As described above, even there is a region which does not emit light at the center of the lighting device 10, this region does not influence the projected light spot. In the meantime, the light distribution of the lighting device of FIG. 17 is approximately 12 degrees.

FIG. 18 is a table, which compares various lighting devices to get the same illuminance. The compared structure (Comparison), in which the lighting device has a different structure from the embodiment, uses one LED. The structures (1) to (4) in FIG. 18, which have structure of the present invention, changes the number or characteristics of the LEDs. The power consumption and heat generation are compared in those structures in FIG. 18.

In FIG. 18, illuminous flux/LED is a flux per one LED; necessary numbers of LEDs means the number of the LEDs per one lighting device to get a necessary illuminance; power consumption/LED (W) is a power consumption per one LED; total power consumption (W) is (power consumption per one LED)×(necessary number of LEDs); colorific value (Kcal) is total power consumption (W) converted to calorie.

As shown FIG. 18, according to the present invention, the power consumption as the total LEDs can be made smaller compared with the case in which one LED is used as the light source. In addition, temperature rise of each of the LEDs can be made lower, thus, a decrease in light emitting efficiency can be suppressed; further, since the heat generation can be suppressed as a lighting device in total, a heat sink, like a fin, etc., can be omitted; in addition, a thickness of the lighting device can be made thin. As to the light distribution angle, approximately 12 degrees can be attainable.

Embodiment 2

Figure 19A:
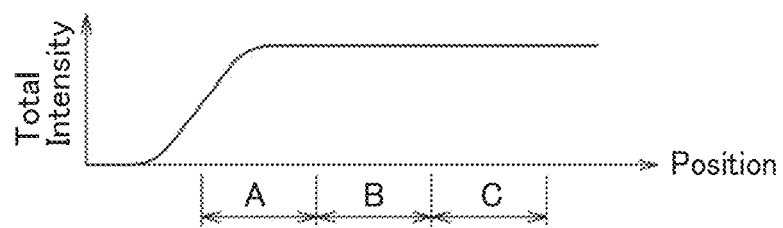
FIG. 19A is an example of illuminous distribution when a liquid crystal lens of embodiment 2 or a liquid crystal lens of embodiment 3 is used.
Figure 19B:
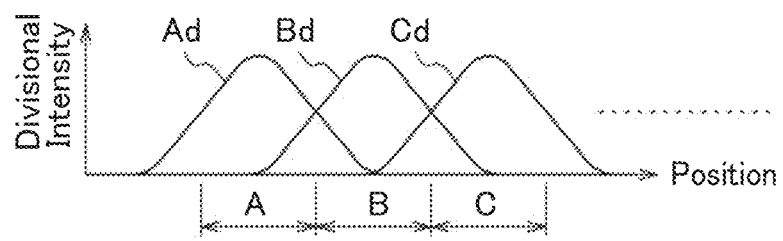
FIG. 19B is an example of illuminance distribution at the irradiated surface corresponding to each of the emitting region when the liquid crystal lens is set on each of the divided emitting region.
Figure 19C:
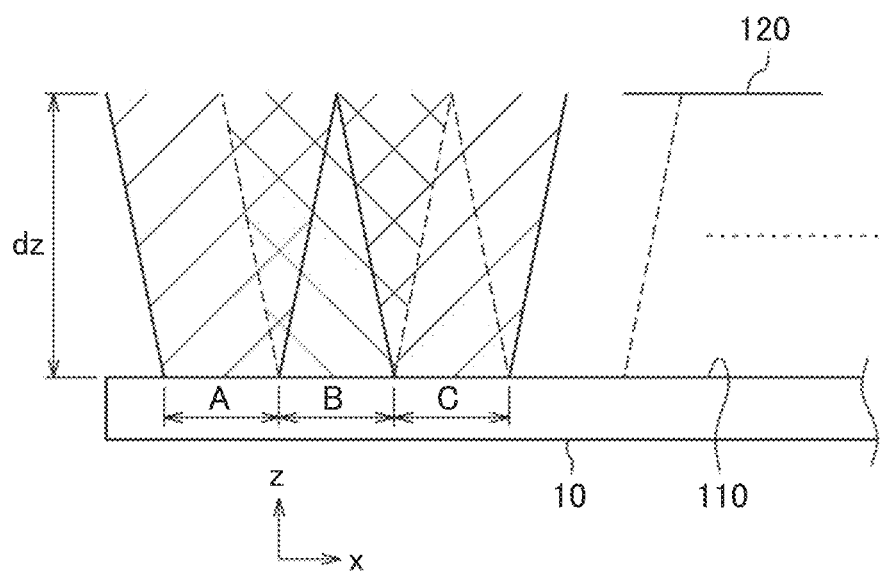
FIG. 19C is a cross sectional view in which the emitting surface is divided into regions to explain a lens action of the liquid crystal lens according to embodiments 2 and 3.

Embodiment 2 relates to the structure to control the outgoing light by setting liquid crystal lens at the emitting surface of the lighting device. FIGS. 19A through 19C are conceptual view relating to a function of the liquid crystal lens. FIG. 19C is a cross sectional view of the lighting device 10. In FIG. 19C, the emitting surface 110 is divided into the regions of A, B, C and so forth. The light having a predetermined light distribution angle is emitted from each of the regions.

FIG. 19B shows an example of illuminance at a distance dz from the emitting surface 110 in FIG. 19C. The vertical axis is an illuminance from each of areas A, B, C, and the like; Ad, Bd, Cd, and so forth are distribution of illuminance, which resembles to a normal distribution. FIG. 19A is a summation of illuminance from each of the areas depicted in FIG. 19B. The vertical axis in FIG. 19A is a summation of illuminance at the irradiated surface 120 from each of the areas at the emitting surface area 110. FIG. 19A shows the total illuminance distribution at the irradiated surface 120, a distance dz away from the emitting surface 110, is trapezoidal.

Embodiment 2 is a structure to set a liquid crystal lens at the emitting surface 110 to control the illuminance distribution at the irradiated surface 120, in other words, to change the illuminance distribution Ad, Bd, Cd, and so forth at the irradiated plane 120, a distance dz away from the emitting surface 110, by changing emitting light distribution at the regions A, B, C and so forth at the emitting surface 110 in FIG. 19B.

Figure 20:
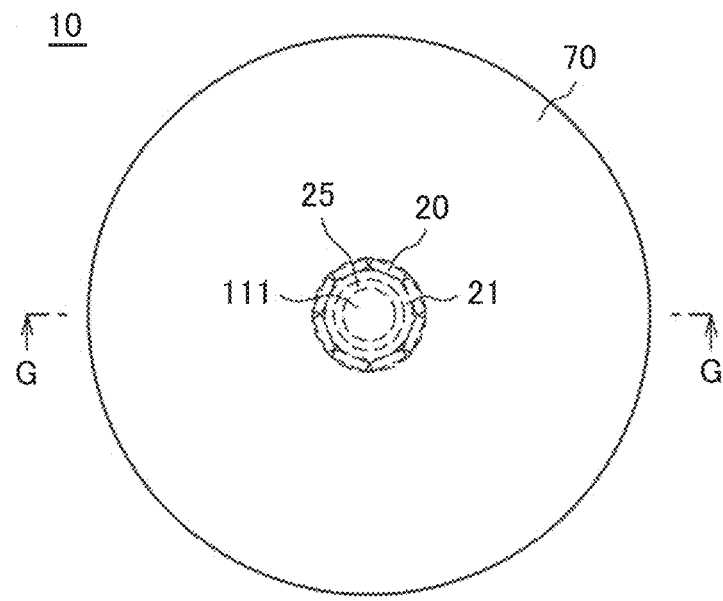
FIG. 20 is a plan view of the lighting device according to embodiment 2.
Figure 21:
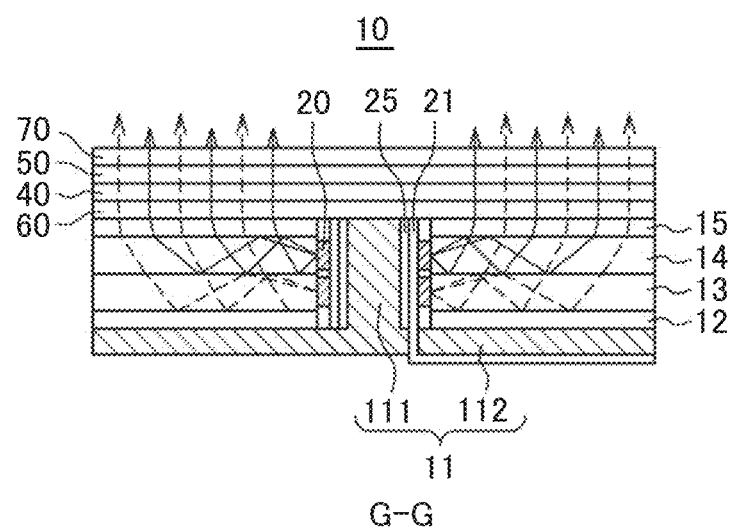
FIG. 21 is a cross sectional view of FIG. 20 along the line G-G.

FIG. 20 is a plan view of the lighting device 10 according to embodiment 2. FIG. 20 is the same as FIG. 5 of embodiment 1 except an upper polarizing plate 70 for the liquid crystal lens is set at the upper most surface in FIG. 20. FIG. 21 is a cross sectional view of FIG. 20 along the line G-G. In FIG. 21, the structures from the frame 11 to prism sheet 15 are the same as FIG. 6. In FIG. 21, a lower polarizing plate 60 is set on the upper prism sheet 15; a lower liquid crystal lens 40 is set on the lower polarizing plate 60; an upper liquid crystal lens 50 is set on the lower liquid crystal lens 40; and the upper polarizing plate 70 is set on the upper liquid crystal lens 50.

Figure 22:
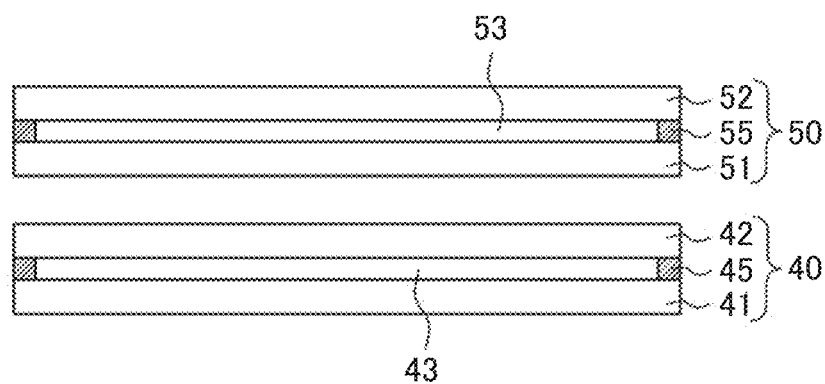
FIG. 22 is a cross sectional view of the liquid crystal lens of FIG. 21.

FIG. 22 is a cross sectional view of the lower liquid crystal lens 40 and the upper liquid crystal lens 50. In the lower liquid crystal lens 40, a first substrate 41 and a second substrate 42 are adhered to each other at the periphery through a seal material 45; a liquid crystal 43 is sealed thereinside. In the upper liquid crystal lens 50, a third substrate 51 and a fourth substrate 52 are adhered to each other at the periphery through a seal material 55; a liquid crystal 53 is sealed thereinside.

Figure 23:
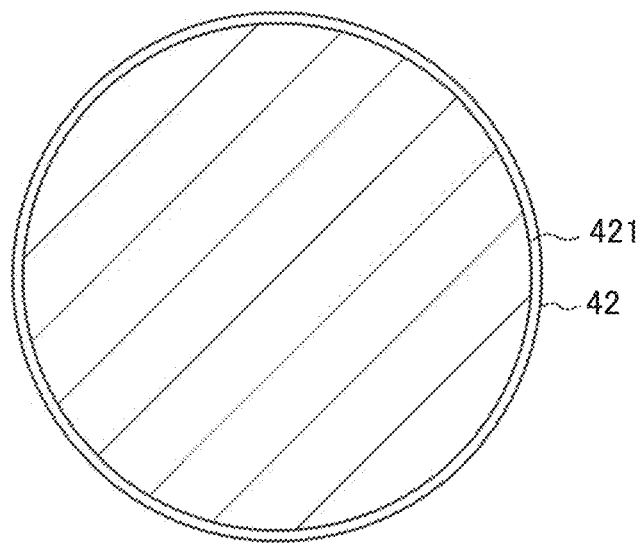
FIG. 23 is a plan view of a second substrate of a first liquid crystal lens.
Figure 24:
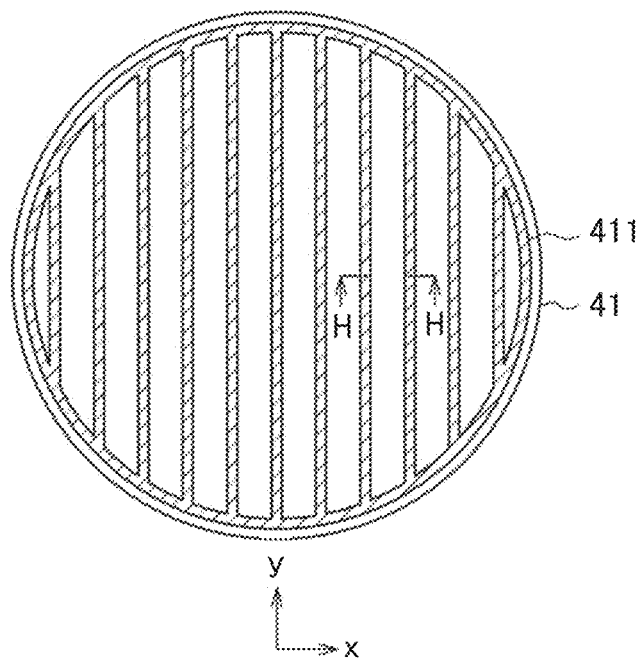
FIG. 24 is a plan view of a first substrate of the first liquid crystal lens.

FIG. 23 is a plan view of a second electrode 421 formed on the second substrate 42 of the lower liquid crystal lens 40. FIG. 24 is a plan view of a first electrode 411 formed on the first substrate 41 of the lower liquid crystal lens 40. In FIG. 24, the first electrodes 411 extend in y direction and are arranged in x direction.

Figure 25:
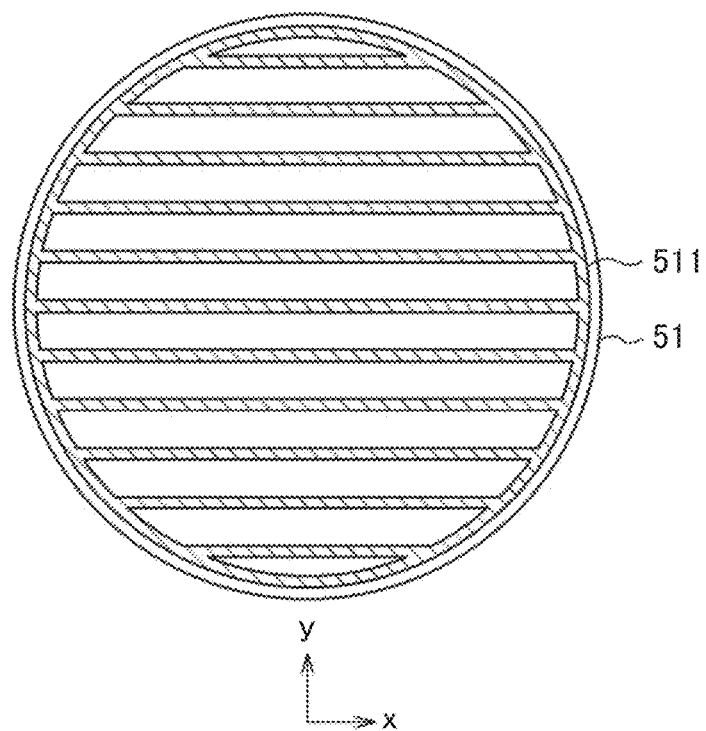
FIG. 25 is a plan view of a third substrate of a second liquid crystal lens.

FIG. 25 is a plan view of a third electrode 511 formed on the third substrate 51 of the upper liquid crystal lens 50. The third electrodes 511 extend in x direction and are arranged in y direction. The fourth electrode formed on the fourth substrate 52 is the same as the second electrode 421 of the lower liquid crystal lens 40 in FIG. 23. All the electrodes from the first electrode through the fourth electrode are made of transparent conductive film as e.g. ITO (Indium Tin Oxide).

Figure 26A:
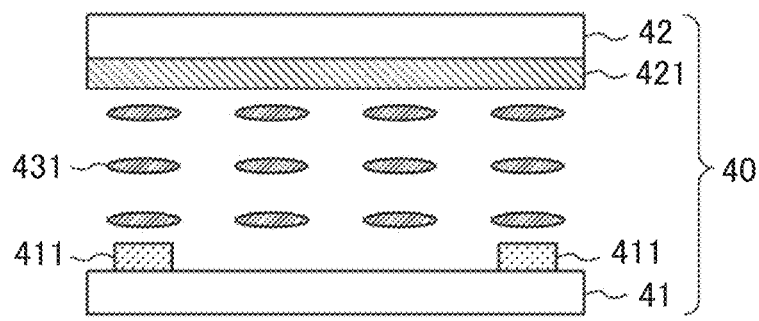
FIG. 26A is a cross sectional view in which a lens action of the liquid crystal lens is shown.
Figure 26B:
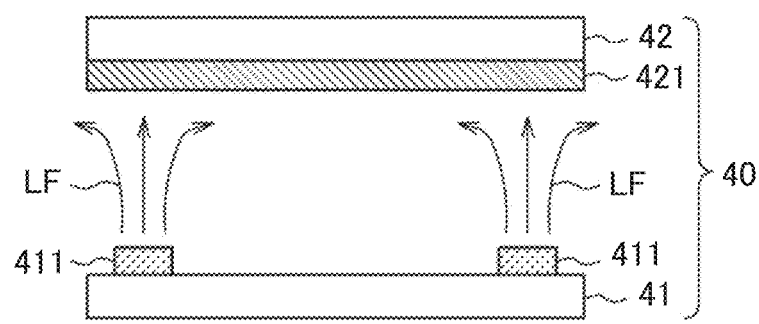
FIG. 26B is another cross sectional view in which a lens action of the liquid crystal lens is shown.
Figure 26C:
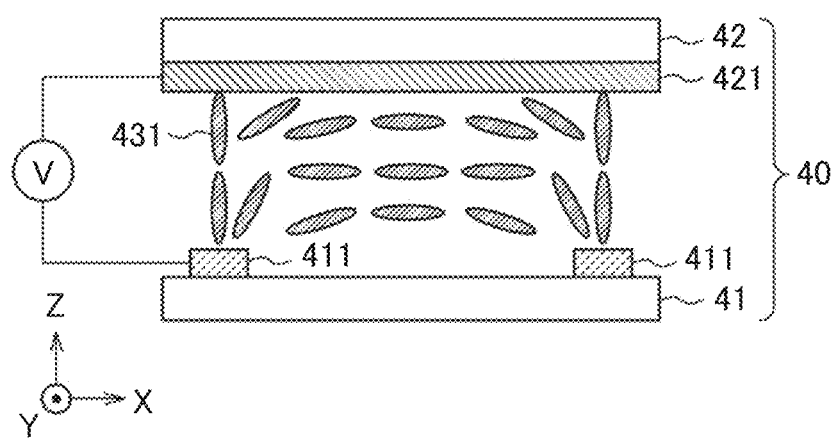
FIG. 26C is yet another cross sectional view in which a lens action of the liquid crystal lens is shown.

FIGS. 26A through 26C are cross sectional views to explain function of the liquid crystal lens, which corresponds to e.g. cross sectional view along the line H-H of FIG. 24. FIG. 26A through FIG. 26C are explained for the lower liquid crystal lens 40; however, the function is the same for the upper liquid crystal lens 50. In FIG. 26A, the comb shaped electrode 411 is formed on the first substrate 41 and the plane electrode 421 is formed on the second substrate 42. Liquid crystal molecules 431 are arranged parallel to the substrate if field is not applied between the electrodes. In other words, it is in a so called homogeneous alignment.

FIG. 26B is an example of lines of forces LF when a voltage is applied between the comb shaped electrode 411 of the first substrate 41 and the plane electrode 421 of the second substrate 42. FIG. 26C is a cross sectional view which shows alignment of the liquid crystal molecules 431 when a voltage is applied to the first electrode 411. In FIG. 26C, the liquid crystal molecules 431 align along the lines of forces LF; consequently, the distribution in refraction is generated, thus, liquid crystal lens is formed. Such a lens is referred to as the distributed refractive index type lens GRIN (Gradient Index Lens).

Figure 27:
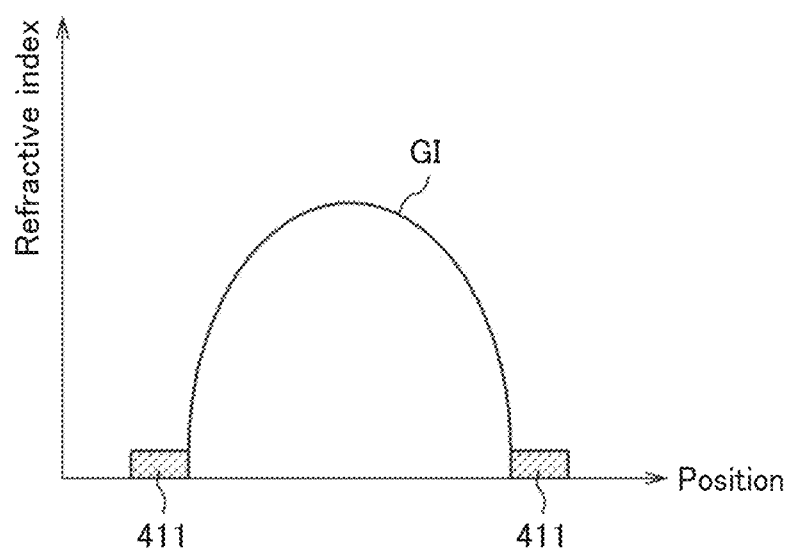
FIG. 27 is a graph that shows a lens action of the liquid crystal lens.

FIG. 27 is an example of the distributed refractive index type lens. The vertical axis of FIG. 27 is refractive index. The refractive index is minimum on the first electrode 411, which is a comb electrode; the refractive index is maximum at the intermediate position between the comb electrodes 411. FIG. 27 shows a normal quadratic curve; however, the distribution of the refractive index can be drastically changed by a voltage between the first electrode 411 and the second electrode 412, a distance between the comb electrodes of the first electrode 411, a thickness of the liquid crystal layer 43, and so forth. Such function is the same in the upper liquid crystal lens 50. However, the directions of the lens action are perpendicular between in the lower liquid crystal lens 40 and in the upper liquid crystal lens 50.

Figure 28:
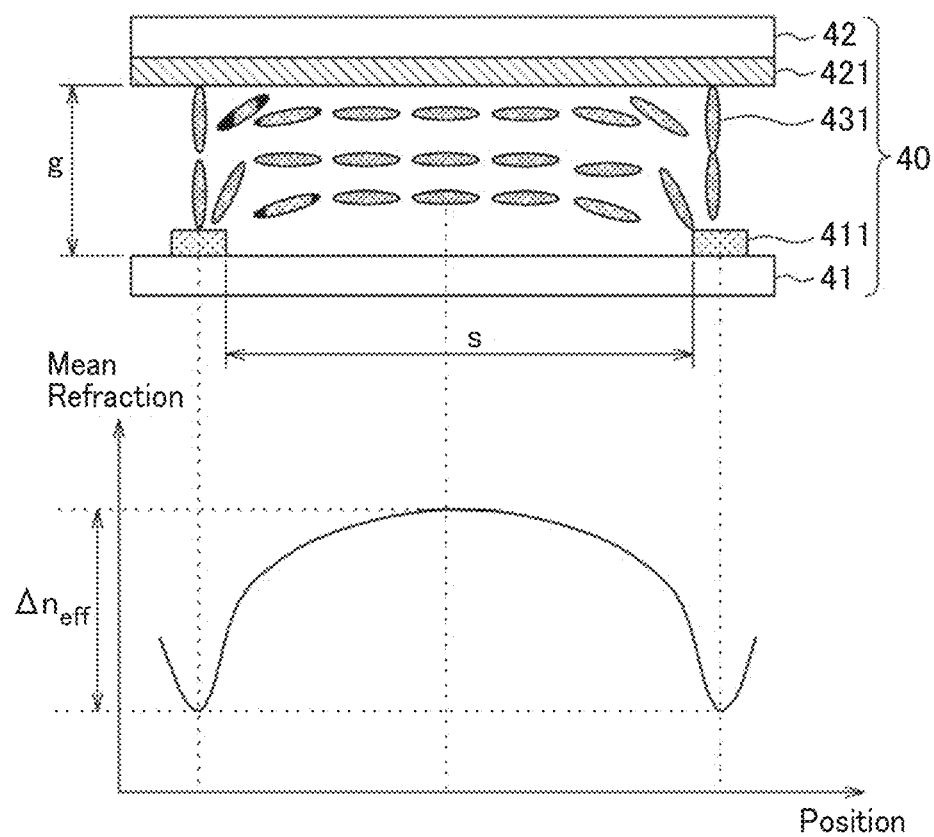
FIG. 28 is a cross sectional view of another shape of the liquid crystal lens.

A lens pitch of the liquid crystal lens is often determined by division number in the emitting surface. On the other hand, a range in thickness g of the liquid crystal layer in the liquid crystal lens is often limited. FIG. 28 is alignments of the liquid crystal molecules 431 and a distribution of the refractive index when the space s between the comb electrodes 411 is substantially larger than a thickness g of the liquid crustal layer. In FIG. 28, the vertical axis is a mean refractive index at each of the positions in the liquid crystal lens; Δneff is a difference of the refractive index in the liquid crystal lens. In the lens in FIG. 28, a lens of small radius of curvature is formed near the comb electrode 411, and a lens of large radius of curvature is formed at the intermediate position between the comb electrodes 411.

Figure 29:
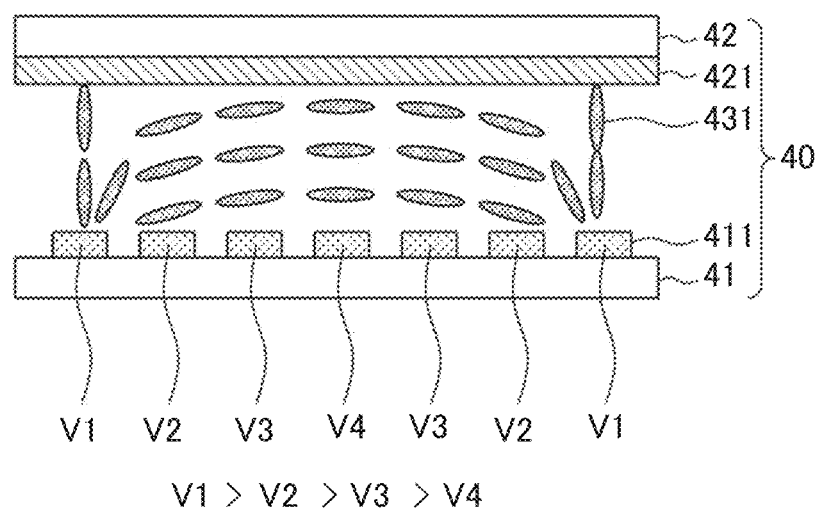
FIG. 29 is a cross sectional view of another structure of the liquid crystal lens.
Figure 30:
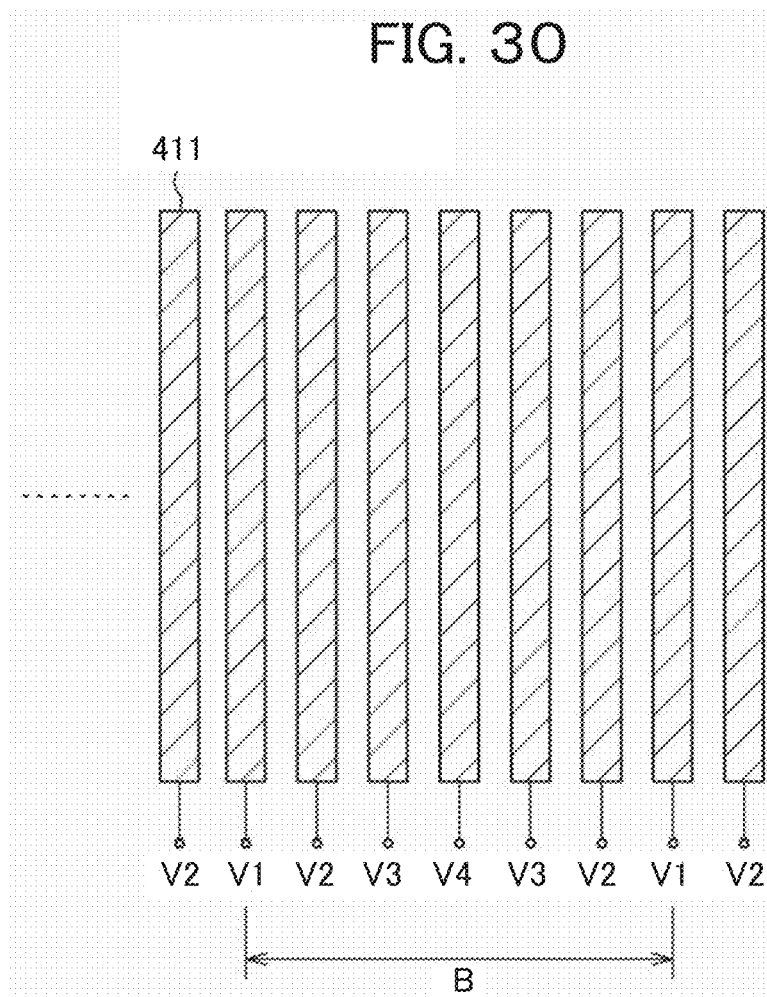
FIG. 30 is a plan view which shows voltages applied to first electrodes of FIG. 29.

In some cases, a lens having curvature shown FIG. 28 may be used; however, in other cases a lens having curvature of quadratic curve is needed. FIG. 29 is a cross sectional view of the liquid crystal lens, in which the lens shape is made in quadratic curve or in smooth curve without changing a pitch of the lens or a thickness of the liquid crystal layer. In FIG. 29, one lens is formed by seven electrodes 411, and different voltage is applied to each of the electrodes 411 to align the liquid crystal molecules 413 so that refractive index curve becomes a quadratic curve in the liquid crystal lens. In FIG. 29, the voltages are applied as V1>V2>V3>V4. FIG. 30 is a plan view of the comb electrodes 411 corresponding to FIG. 29. For example, the region B in FIG. 30 corresponds to the region B in FIG. 19C.

Figure 31:
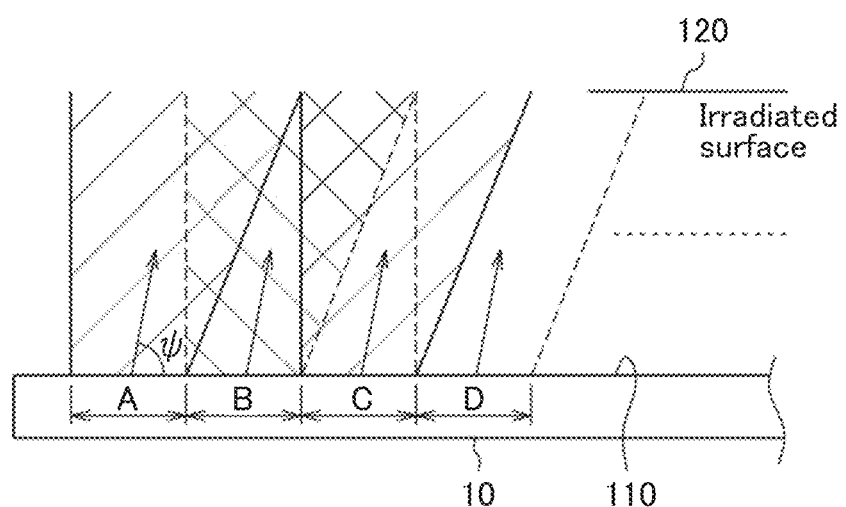
FIG. 31 is a cross sectional view that shows a function of the liquid crystal lens.

In some cases, the direction of the light from the lighting device 10 is intended in a certain direction, not normal to the emitting surface 110. FIG. 31 is an example in which the light from each of the regions A, B, C, and the like is emitted in the direction of ψ to the emitting surface 110, not normal to the emitting surface 110. Such function can be attained by shaping each of the liquid crystal lenses asymmetric.

Figure 32:
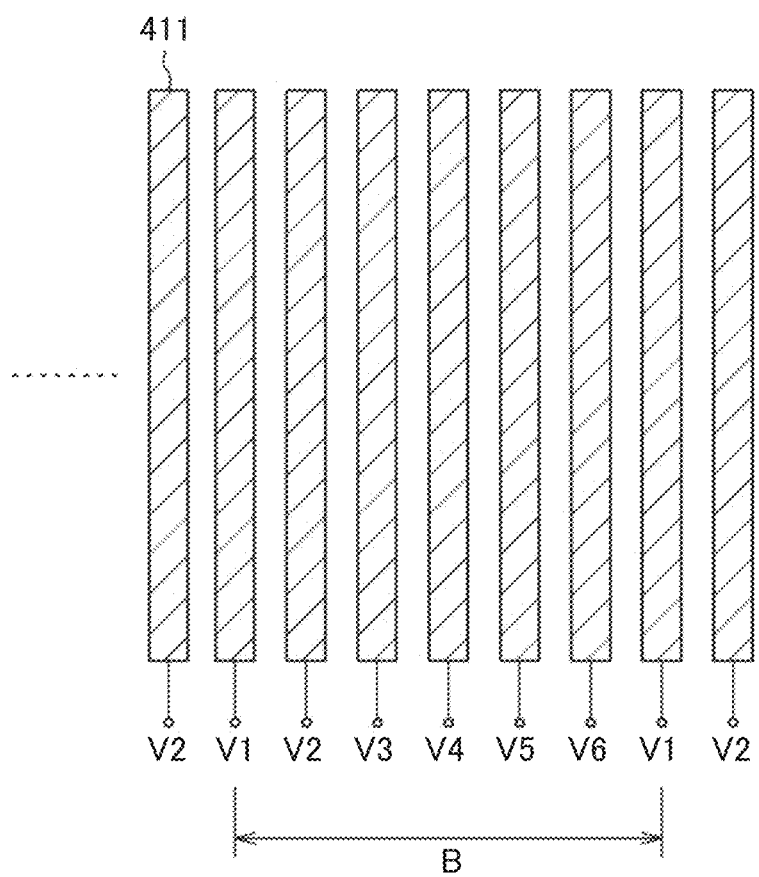
FIG. 32 is a plan view which shows an example of voltages applied to the first electrodes for a lens action of FIG. 31.

FIG. 32 is a plan view of the comb electrodes 411 in which voltages are applied asymmetrically to each of the comb electrodes 411 to make the asymmetric lens. As shown in FIG. 32, the voltages are applied as V1>V2>V3>V4, and V1>V5≠V3, and V1>V6≠V2. As a result, the liquid crystal molecules 431 are aligned to form an asymmetric lens in the cross sectional view of the liquid crystal lens as shown in FIG. 29.

Figure 33A:
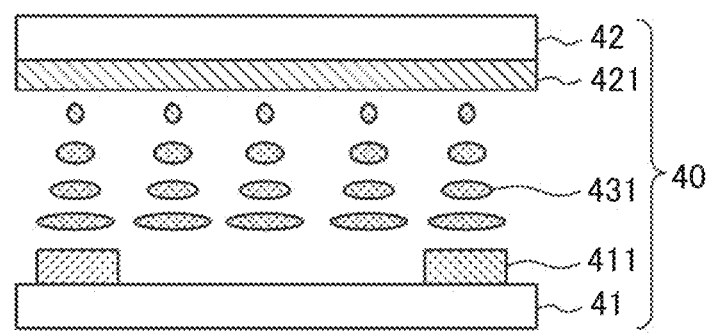
FIG. 33A is a cross sectional view of a lens action of the liquid crystal lens constituted by a TN type liquid crystal.
Figure 33B:
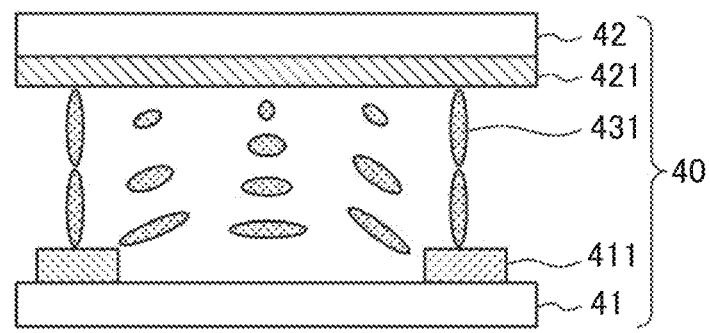
FIG. 33B is another cross sectional view of a lens action of the liquid crystal lens constituted by the TN type liquid crystal.

The liquid crystal lens can be realized not only by the homogeneous alignment liquid crystal as shown in FIG. 26A or 29 but also by various other types of liquid crystal devices. FIGS. 33A and 33B are examples that the liquid crystal lens is formed by TN (Twisted Nematic) type liquid crystal. In the TN type, the liquid crystal molecules 431 rotate their alignment direction in 90 degrees between the first substrate 41 and the second substrate 42.

FIG. 33A is an example in which a voltage is not applied between the first electrode 411 and the second electrode 421. In this case, the liquid crystal molecules 431 are aligned in parallel to the first substrate 41 or the second substrate 42; however, alignment direction of the liquid crystal molecules 431 rotates 90 degrees between a region near the first substrate 41 and a region near the second substrate 42. FIG. 33B is an example in which a voltage is applied between the first electrode 411 and the second electrode 421. In this case, the liquid crystal molecules 431 align in vertical direction to the first substrate 41 at directly above the comb electrode 411, thus, the light is shut. In the intermediate position between the comb electrodes 411, however, the liquid crystal molecules 431 are not influenced by electric field and maintain rotation of 90 degrees with respect to the alignment direction near the first substrate 41; thus, transmittance is not influenced.

When the structure of FIG. 33B is evaluated as a lens, the refractive index is minimum directly above the comb electrode 411 and the refractive index is maximum at the intermediate position between the comb electrodes 411. Therefore, the distributed refractive index type lens GRIN (Gradient Index Lens) is formed. Various shapes of lenses can be realized by configuring the electrodes as in FIG. 29 or FIG. 32 even when the lens is formed by TN type liquid crystal.

Figure 34A:
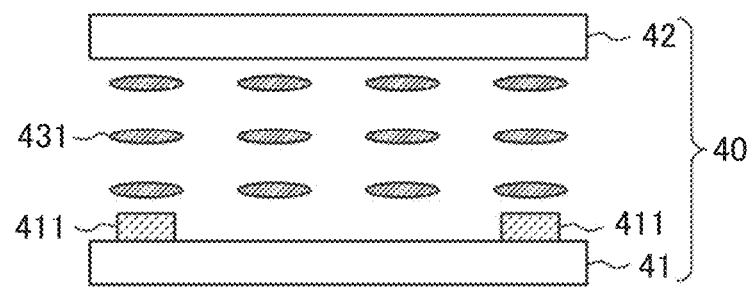
FIG. 34A is a cross sectional view in which a lens action is revealed by applying a voltage between the comb electrodes.
Figure 34B:
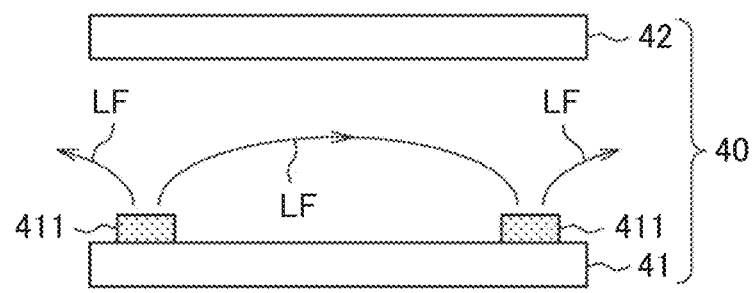
FIG. 34B is another cross sectional view in which a lens action is revealed by applying a voltage between the comb electrodes.
Figure 34C:
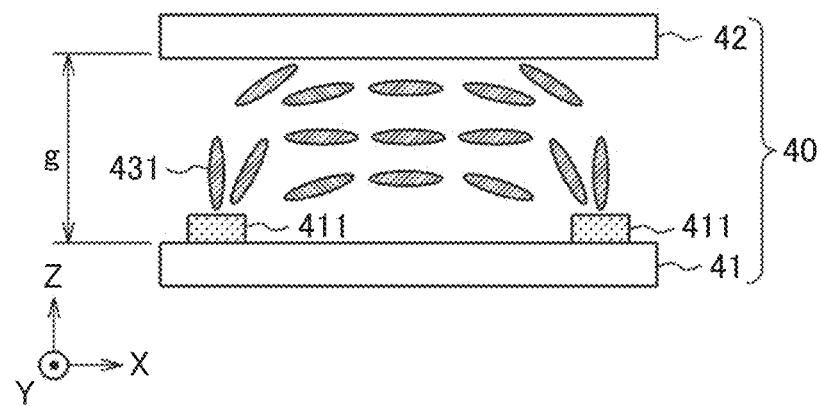
FIG. 34C is yet another cross sectional view in which a lens action is revealed by applying a voltage between the comb electrodes.

FIGS. 34A to 34C are cross sectional views in which the liquid crystal lens is formed by applying a voltage between the first electrodes 411 of comb shape. In FIG. 34A, the comb electrodes 411 are formed on the first substrate 41. On the other hand, no electrode is formed on the second substrate 42. The liquid crystal lens is constituted by the liquid crystal molecules 431 being aligned by applying a voltage between the comb electrodes 411, thus, the second electrode 421 is not indispensable. The second electrode 421 is formed by a transparent conductive film as ITO (Indium tin Oxide); however, even a transparent conductive film absorbs or reflects light in certain degree, thus, it is profitable from a view of transmittance of the lens that the second electrode 421 does not exist. The second electrode 421 may be formed on the second substrate 42 e.g. if the shape of the lens is intended to be changed.

FIG. 34B shows lines of forces LF generated by applying a voltage between the comb electrodes 411. The lines of forces LF are directed vertically to the substrate 41 at the region directly above the comb electrode 411; the lines of forces LF are directed in parallel to the substrate 41 at the intermediate position between the comb electrodes 411. The liquid crystal molecules 431 align in the lines of forces LF.

FIG. 34C is a cross sectional view in which the liquid crystal molecules 431 align in the field that is depicted in FIG. 34B. In FIG. 34C, the refractive index is minimum at directly above the comb electrode 411 and is maximum at the intermediate position between the comb electrodes 411. Therefore, in this case too, the distributed refractive index type lens GRIN (Gradient Index Lens) is formed.

Figure 35:
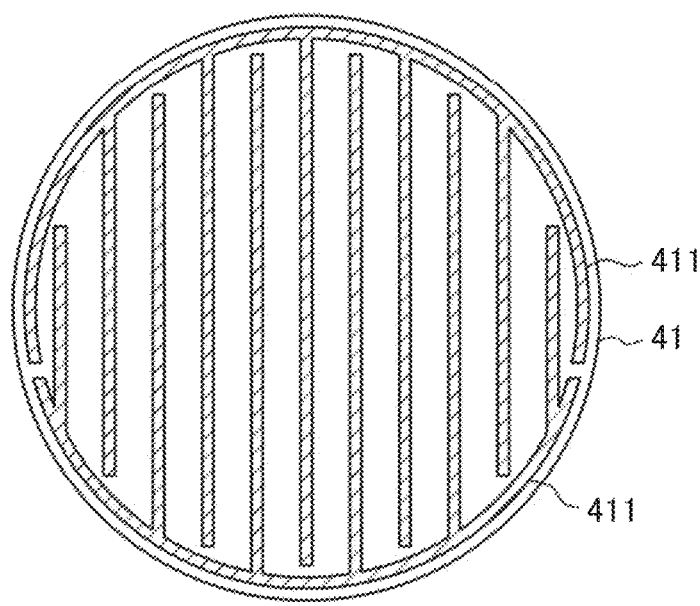
FIG. 35 is a plan view of the first electrode of the liquid crystal lens in which lens action is revealed by applying a voltage between the comb electrodes.

FIG. 35 is a plan view of the first electrode 411 formed on the first substrate 41. In FIG. 35, the first comb electrode 411 and the second comb electrode 411 are nested. The liquid crystal lens depicted in FIG. 34C is formed by applying a voltage between the first comb electrode 411 and the second comb electrode 411. Various liquid crystal lenses can be formed by changing a thickness g of the liquid crystal layer, a distance s between the comb electrodes 411, and a voltage V applied between the comb electrodes 411.

Figure 36:
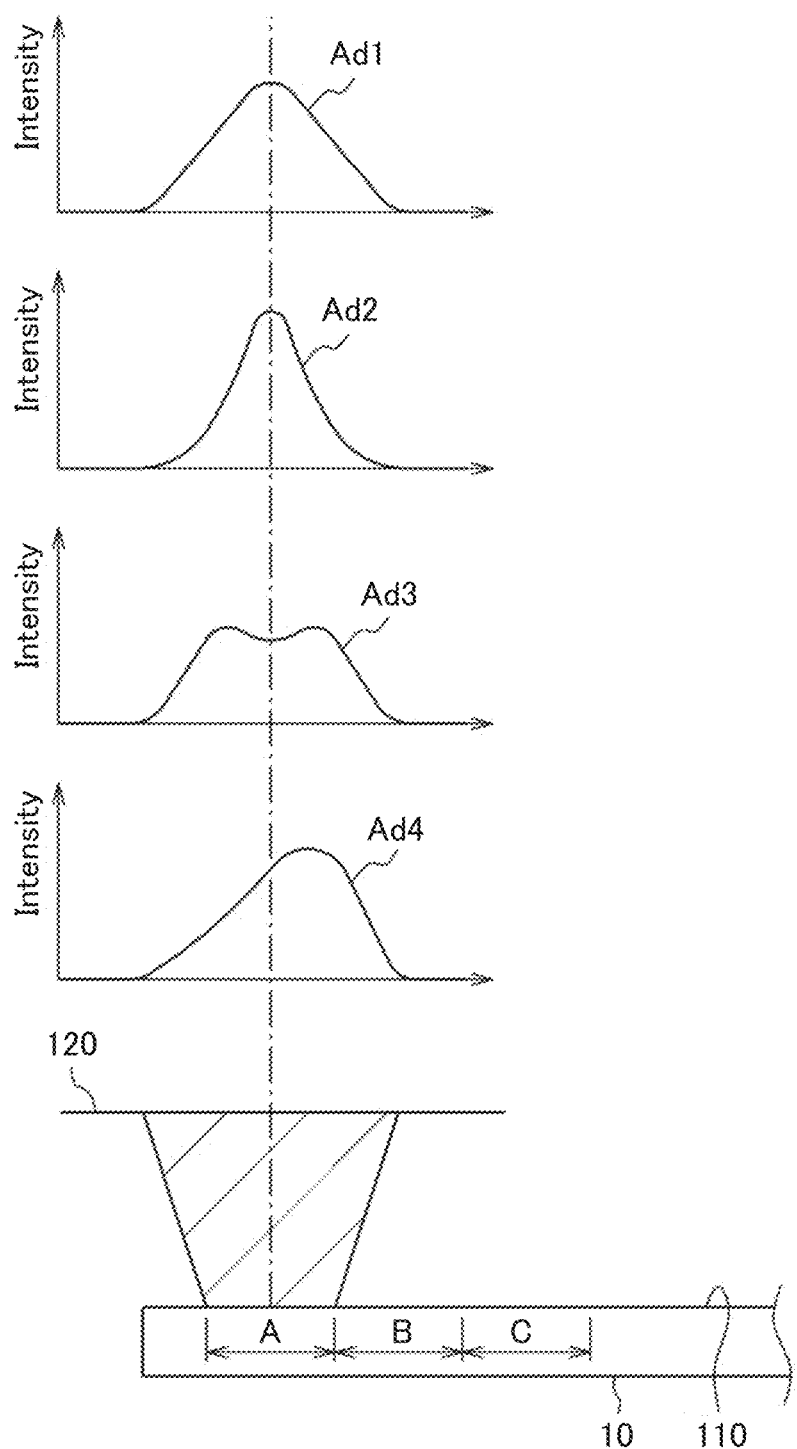
FIG. 36 is a cross sectional view of the illuminance distribution according to the liquid crystal lenses of embodiments 2 and 3.

As described above, lenses of various functions can be formed not only by changing a distance between the electrodes, a thickness of the liquid crystal layer, and an applied voltage between the electrodes, but also by the types of liquid crystal lenses. FIG. 36 shows examples to change the illuminance distribution by the liquid crystal lens. FIG. 36 is the same structure as FIG. 19B and FIG. 19C, however, only emitting light from the region A is shown. FIG. 36 shows that the distribution of the emitting light can be changed in various shapes by the liquid crystal lens set in the region A.

The illuminance distribution Ad1 resembles to the normal distribution; the illuminance distribution Ad2 also resembles to the normal distribution, however, the light is more condensed. The illuminance distribution Ad3 shows a case where the liquid crystal lens is used as a divergence lens to acquire a trapezoidal illuminance distribution. The illuminance distribution Ad4 shows a case where a direction of the axis of the illuminance distribution is deviated in polar angle by making the liquid crystal lens asymmetric.

As explained in FIGS. 19A to 19C, the illuminance distribution on the screen 120 is a summation of the light emitted from each of the regions of the emitting surface 110. In other words, the illuminance distribution on the irradiating surface 120 can be changed by changing the illuminance distribution from each of the regions, A, B, C, and the like in the emitting surface 110.

Embodiment 3

Figure 37:
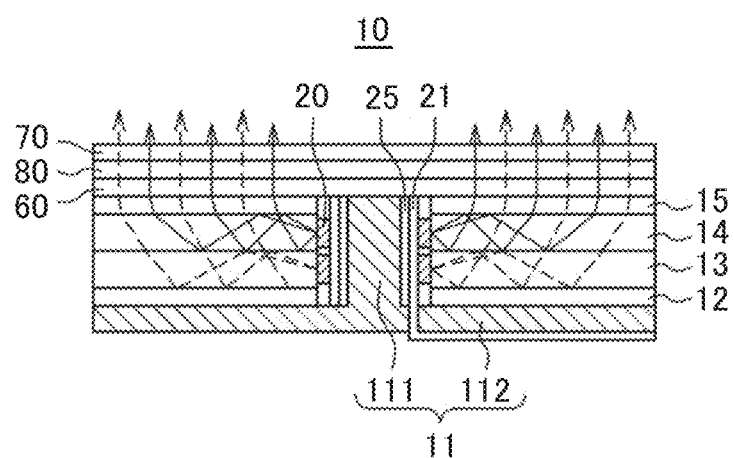
FIG. 37 is a cross sectional view of the lighting device of embodiment 3.

FIG. 37 is a cross sectional view of the lighting device according to embodiment 3. In embodiment 3, the lens action of the liquid crystal lens is in radial direction. In FIG. 37, only one liquid crystal lens 80 is used, other structures are the same as FIG. 5 or 21. The VA (Vertical alignment) type liquid crystal, namely, the homeotropic alignment liquid crystal, is used to form the liquid crystal lens 80 whose lens action is in radial direction. Rubbing process or photo alignment process to align the liquid crystal molecules 431 in a direction parallel to the alignment film is not necessary in the VA type liquid crystal.

Figure 38:
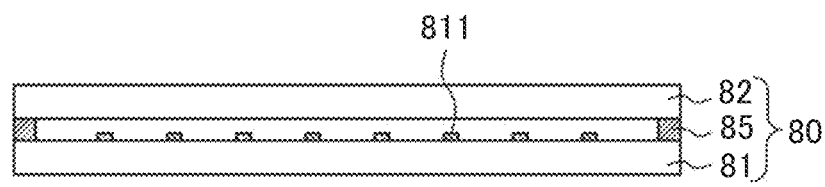
FIG. 38 is a cross sectional view of the liquid crystal lens of FIG. 37.
Figure 39:
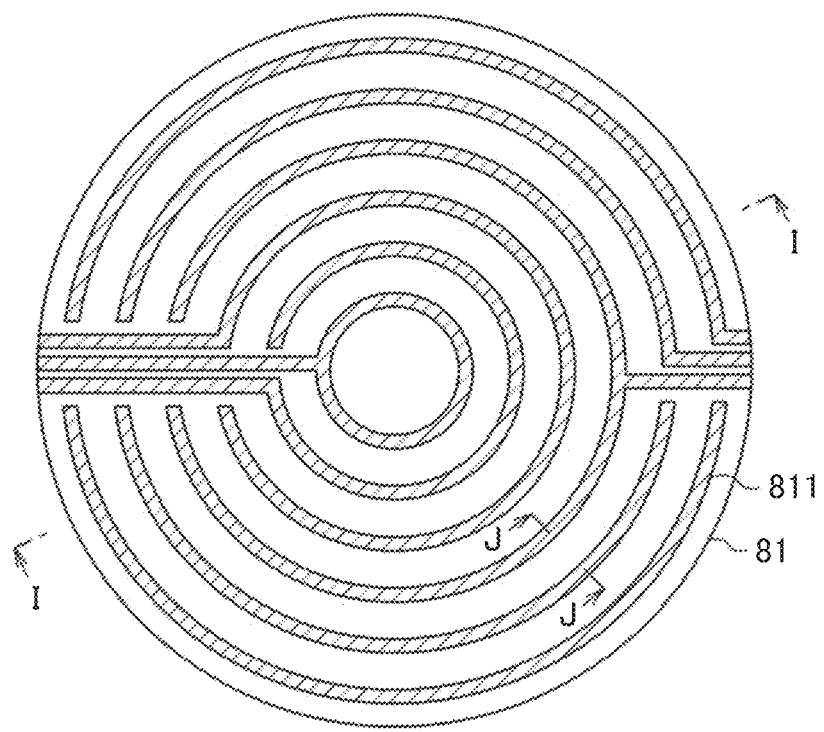
FIG. 39 is a plan view of the first substrate of the liquid crystal lens.

FIG. 38 is a cross sectional view of the liquid crystal lens 80; FIG. 39 is a plan view of a first electrode 811 formed on a first substrate 81 of the liquid crystal lens 80. FIG. 38 corresponds to the cross sectional view of FIG. 39 along the line I-I. In the liquid crystal lens of FIG. 38, an electrode is not formed on a second substrate 82; the liquid crystal lens is formed by applying voltages between the ring shaped electrodes of the first electrode 811 formed on the first substrate 81.

Figure 40A:
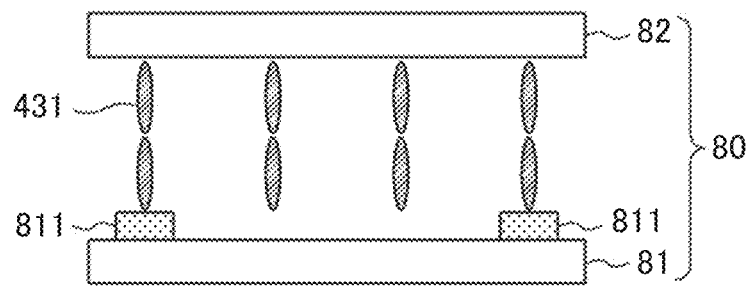
FIG. 40A is a cross sectional view of a lens action of the liquid crystal lens according to FIG. 39 along the line J-J.
Figure 40B:
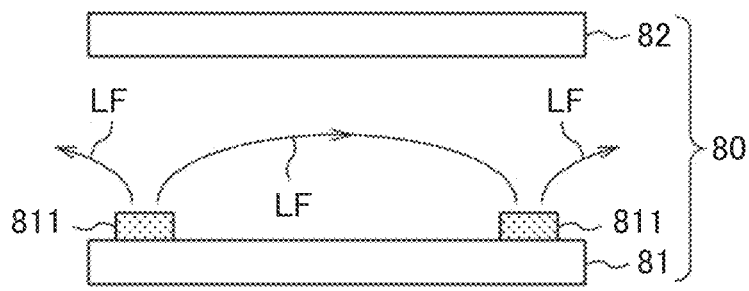
FIG. 40B is another cross sectional view of a lens action of the liquid crystal lens according to FIG. 39 along the line J-J.
Figure 40C:
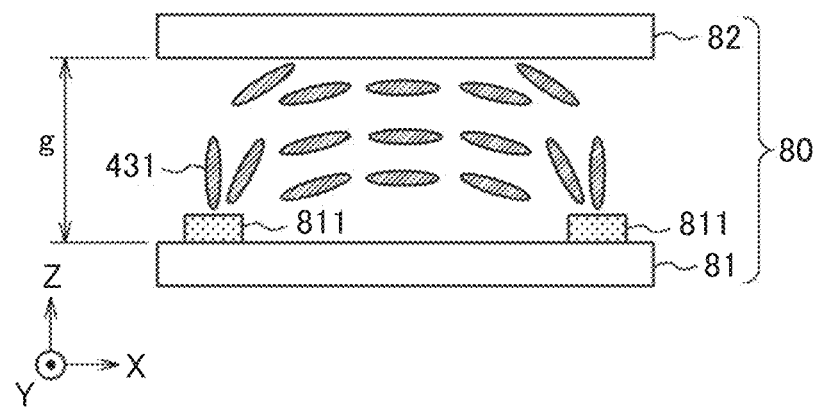
FIG. 40C is yet another cross sectional view of a lens action of the liquid crystal lens according to FIG. 39 along the line J-J.

In FIG. 39, concentrically formed plural ring shaped electrodes constitute the first electrode 811. Each of the ring shaped electrodes 811 can be applied with voltages independently. FIGS. 40A to 40C, which correspond to a cross sectional view of FIG. 39 along the line J-J, explain the lens function of embodiment 3. FIG. 40A is a cross sectional view in which a voltage is not applied to the first electrode 811. Since the liquid crystal is homeotropic in this embodiment, the liquid crystal molecules 431 align vertically to the main planes of the first substrate 81 and the second substrate 82.

FIG. 40B shows lines of forces LF when a voltage is applied between the first electrodes 811. The line of force LF is directed vertically to the substrate 81 at directly above the comb electrode 811, and is directed parallel to the substrate 41 at the intermediate position between the comb electrodes 811. The liquid crystal molecules 431 align along with the line of force LF.

FIG. 40C is a cross sectional view in which the liquid crystal molecules 431 align with the field of FIG. 40B. In FIG. 40C, the refractive index is minimum at directly above the comb electrode 811 and maximum at the intermediate position between the comb electrodes 811. Therefore, in this case too, the distributed refractive index type lens GRIN (Gradient Index Lens) is formed.

In this case, each of lenses is formed in radial direction of the ring electrodes 811 or in radial direction of the circular first substrate 81 and the circular second substrate 82. However, the function of each of the lenses in the lighting device is the same as explained in FIGS. 19A through 19C and FIG. 36 and so forth.

Embodiment 4

Figure 41:
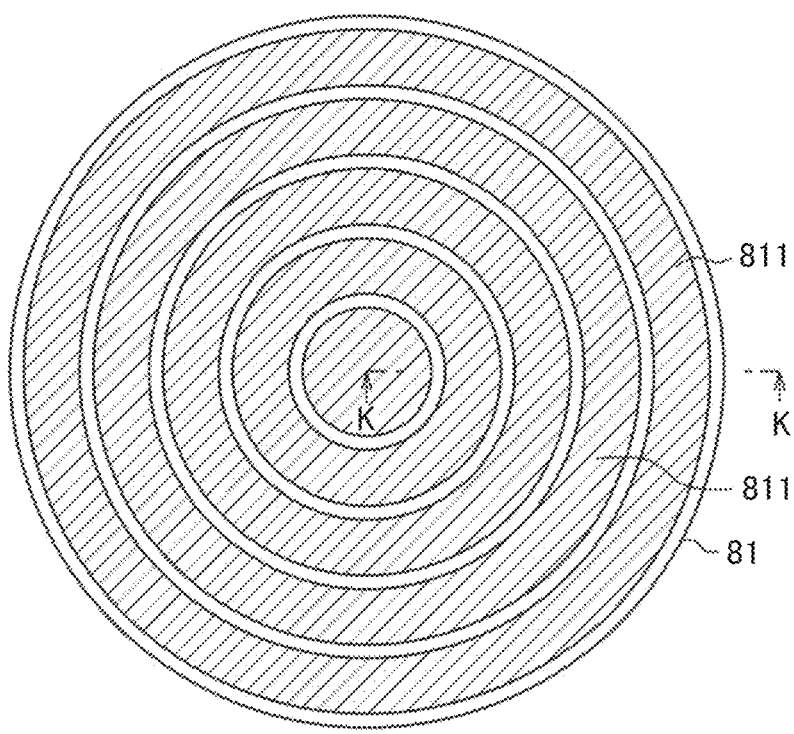
FIG. 41 is a plan view of the first substrate of the liquid crystal lens according to embodiment 4.

This embodiment relates to the structure in which one liquid crystal lens as a whole is formed in circular liquid crystal lens. FIGS. 41 through 44 show an example of this structure. In the meantime, a plan view of the lighting device of embodiment 4 is the same as FIG. 20, and a cross sectional view of the lighting device of embodiment 4 is the same as FIG. 37. Further, the lower polarizing plate 60 and upper polarizing plate 70 of FIG. 32 and so forth also can be used in embodiment 4. FIG. 41 is an example of the first electrode 811 formed on the circular first electrode 81. Plural ring shaped electrodes formed in concentric constitute the first electrode 811. The width of the ring electrode of FIG. 41 is wider than that of FIG. 39. The leader lines are omitted in FIG. 41.

Figure 42:
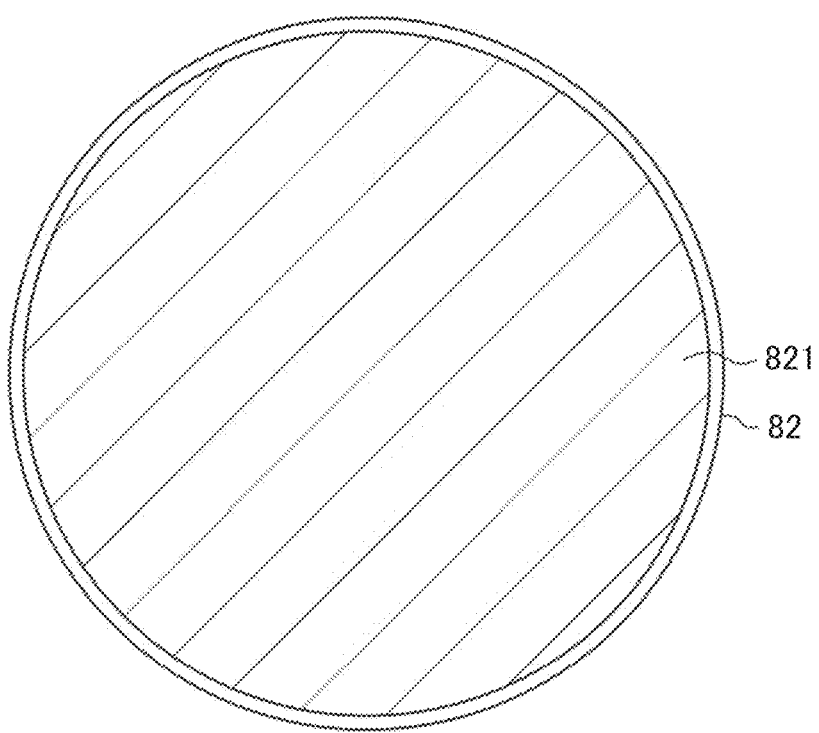
FIG. 42 is a plan view of the second substrate of the liquid crystal lens according to embodiment 4.
Figure 43:
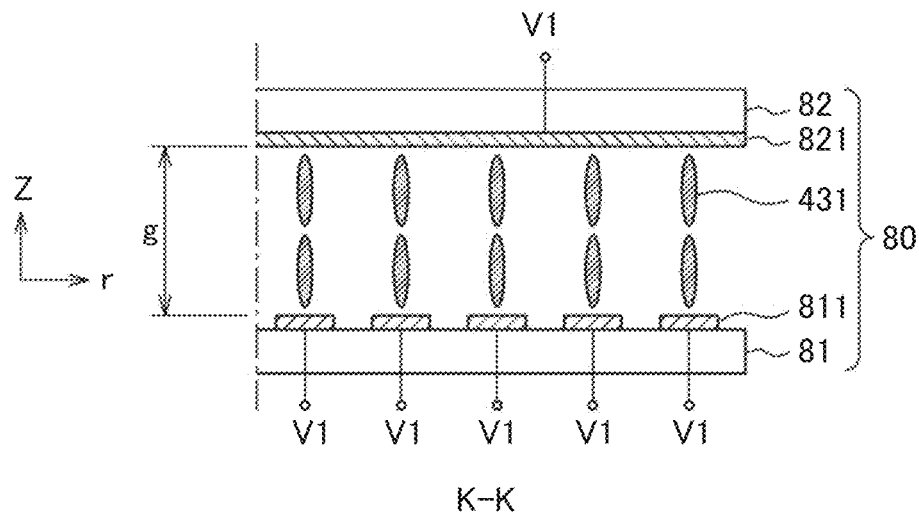
FIG. 43 is a cross sectional view which shows a lens action of the liquid crystal lens of embodiment 4.
Figure 44:
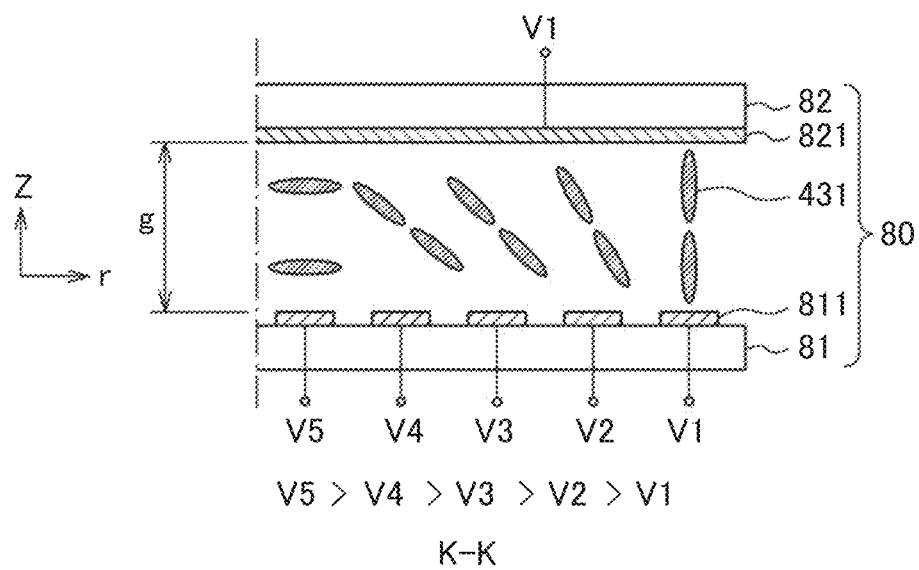
FIG. 44 is another cross sectional view which shows a lens action of the liquid crystal lens of embodiment 4.

FIG. 42 is an example of a second electrode 821 formed on the circular second substrate 82. The second electrode 821 is formed in disc shape. The liquid crystal is inserted between the first substrate 81 and the second substrate 82 to constitute the liquid crystal lens. FIGS. 43 and 44 are cross sectional views after the first substrate 81 and the second substrate 82 are assembled; FIGS. 43 and 44 correspond to the cross sectional views of FIG. 41 along the line K-K.

FIG. 43 is a cross sectional view of the liquid crystal lens in which a voltage is not applied between the disc shaped second electrode 821 and the ring shaped first electrodes 811. In FIG. 43, since the liquid crystal is homeotropic type, the liquid crystal molecules 431 align vertically to the major surfaces of the first substrate 81 and the second substrate 82. In FIG. 43, r direction means a radial direction.

FIG. 44 is a cross sectional view in which different voltages are applied to the plural ring shaped first electrodes 811. In FIG. 44, the voltage applied to the second electrode 821 is V1; voltages V1, V2, V3, V4, and V5 are applied to each of the ring shaped first electrodes 811 in order from outside, and V1<V2<V3<V4<V5. The tilting of the liquid crystal molecules 431 becomes larger according to the voltage applied to the first electrode 821 becoming lager; and the liquid crystal molecules 431 align approximately parallel to the first substrate 81 at the center of the first substrate 81.

When FIG. 44 is viewed as a liquid crystal lens, refractive index at the center of the first substrate 81 is maximum where voltage V5 is applied to the first electrode 811 and the liquid crystal molecules 431 align in parallel to the first substrate 81; refractive index at the periphery is minimum where voltage V1 is applied to the first electrode 811 and the liquid crystal molecules 431 align vertically to the first substrate 81. Therefore, from the peripheral portion to the center of the liquid crystal lens, the distributed refractive index type lens GRIN (Gradient Index Lens) is formed. In the liquid crystal lens according to this embodiment, the lens characteristics can be changed according to voltages applied to the plural first electrodes 811, number of the plural electrodes 811, thickness g of the liquid crystal layer and so forth.

Embodiment 5

Figure 45:
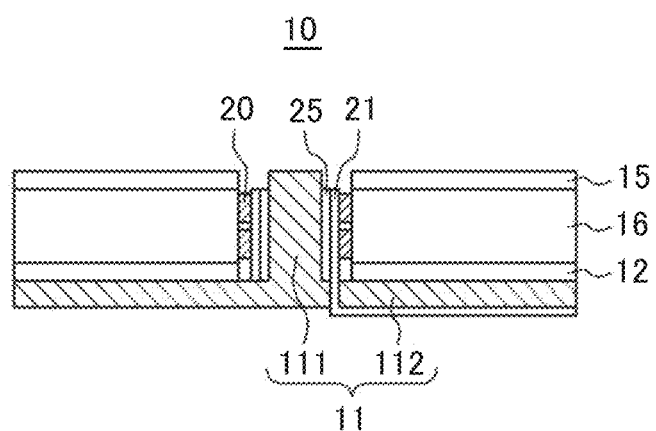
FIG. 45 is a cross sectional view of the lighting device according to embodiment 5.

Embodiment 1, shown by FIG. 6, uses two light guides. However, if it is difficult to use two light guides, the two light guides can be substituted by one light guide 16. FIG. 45 is a cross sectional view the lighting device 10 according to this structure. A plan view of FIG. 45 is the same as a plan view of FIG. 6. In FIG. 45, LEDs are disposed in two tiers along the inner side wall of the light guide 16. The configuration of the arrangement of the LEDs 20 are the same as FIG. 14. Therefore, a brightness of the light source is the same as in embodiment 1.

Figure 46A:
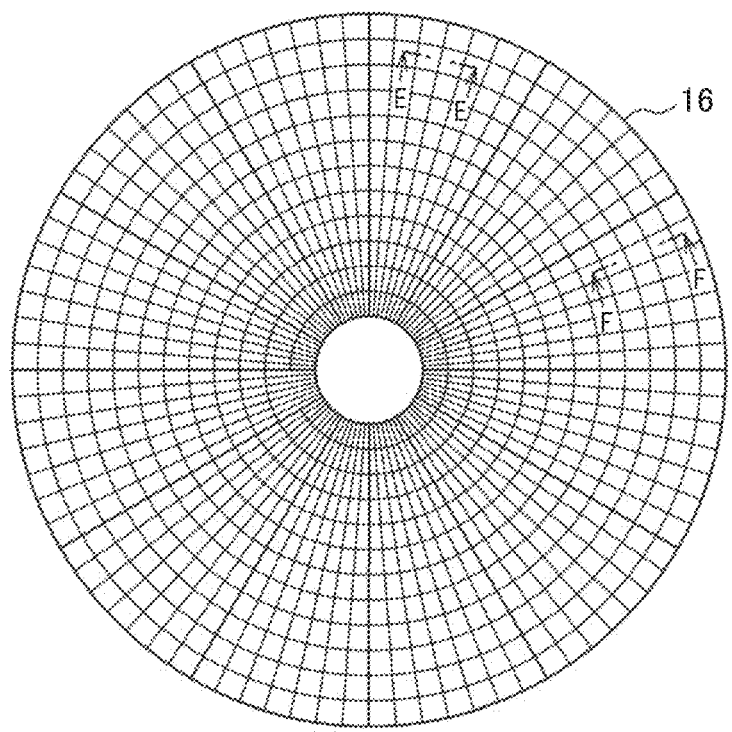
FIG. 46A is a plan view of the light guide of FIG. 45.
Figure 46B:
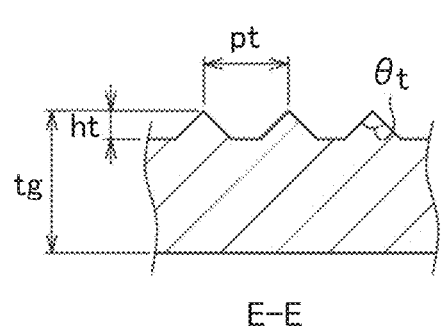
FIG. 46B is a cross sectional view of the light guide along the line E-E of FIG. 46A.
Figure 46C:
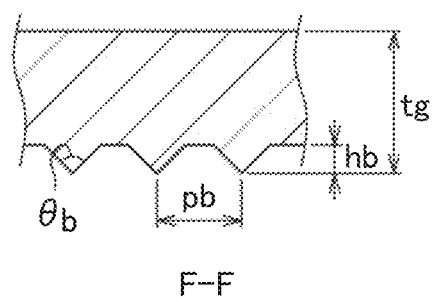
FIG. 46C is a cross sectional view of the light guide along the line F-F of FIG. 46A.

FIGS. 46A to 46C show configuration of the light guide 16. FIG. 46A is a plan view of the light guide 16. In FIG. 46A, the first prism array is formed on the major surface radially in radial direction. Unlike FIG. 10A of embodiment 1, the first prism array in this case is formed all around in the circumferential direction. The second prism array is formed on the back surface of the light guide 16 in concentrically. Unlike FIG. 10A of embodiment 1, the second prism array in this case is also formed all around in circumferential direction.

FIG. 46B is a cross sectional view of the first prism array formed on the major surface. This cross sectional view of FIG. 46B is the same as explained in FIG. 10B. FIG. 46C is a cross sectional view of the second prism array formed on the back surface. This cross sectional view of FIG. 46C is the same as explained in FIG. 10C.

Since two light guides exist in the structure of embodiment 1, reflections occur at the interface between the top light guide 14 and the bottom light guide 13; however, such reflections at the interface do not occur in this embodiment, since there is only one light guide. Other functions are the same as explained in embodiment 1.

Figure 47:
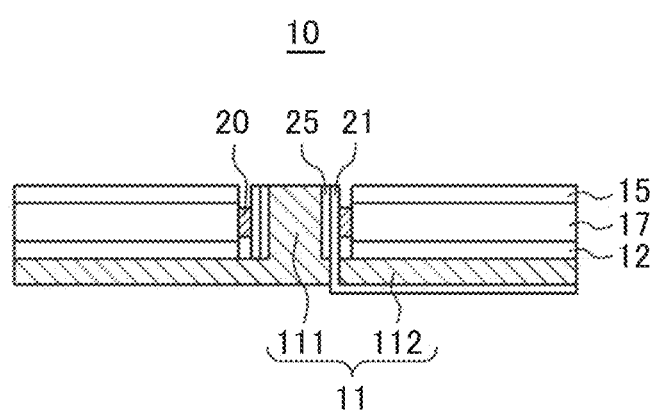
FIG. 47 is a cross sectional view of the lighting device according to another example of embodiment 5.

FIG. 47 is a cross sectional view of the lighting device, which is intended to be formed extremely thin. A plan view of FIG. 47 is the same as FIG. 5 of embodiment 1. The structure of FIG. 47 differs from the structure of FIG. 45 in that the LEDs 20 are arranged in one tier to make the thickness of the light guide 17 thin. The configuration of the first prism array on the major surface and the configuration of the second prism array on the back surface of the light guide 17 in this embodiment can be the same as FIG. 10A to FIG. 10C, or FIG. 46A to FIG. 46C. Other structures of FIG. 47 are the same as FIG. 6 or FIG. 45.

The structure, which uses two light guides, is explained in embodiment 1; and the structure, which uses one light guide, is explained in embodiment 5. The present invention, however, can be applied to the lighting device which uses three or more light guides. The prism arrays formed on the major surface and the back surface of the light guide can be similar structure as the case of embodiment 1.

What is claimed is:
1. A lighting device comprising:
a first light guide having a first top surface and a first back surface,
a second light guide having a second top surface and a second back surface, which stacked on the first light guide,
a first LED emitting light toward the first light guide, and
a second LED emitting light toward the second light guide,
wherein
the first light guide and the second light guide are disc shape,
the first light guide has a first hole at a first center,
the second light guide has a second hole at a second center,
the first LED is disposed facing a first inner side wall of the first light guide at the first hole, and
the second LED is disposed facing a second inner side wall of the second light guide at the second hole.
2. The lighting device according to claim 1, wherein
a plurality of the first LED are disposed along a circumferential direction of the first inner side wall of the first hole of the first light guide,
a plurality of the second LED are disposed along a circumferential direction of the second inner side wall of the second hole of the second light guide, and
the plurality of the first LED and the plurality of the second LED are displaced in azimuth direction.
3. The lighting device according to claim 1, wherein
a reflecting sheet is disposed under the first light guide,
a prism sheet having a third top surface and a third back surface is disposed above the second light guide, and
the prism sheet has a first prism array forming concentrically on the third back surface facing the second light guide.
4. The lighting device according to claim 2, wherein
the first light guide has a second prism array which extending radially in radial direction and arranged in circumferential direction on the first top surface facing the second light guide, and a third prism array which forming concentrically on the first back surface facing the reflecting sheet, and
the second light guide has a fourth prism array which extending radially in radial direction and arranged in circumferential direction on the second top surface facing the prism sheet, and a fifth prism array which forming concentrically on the second back surface facing the first light guide.
5. The lighting device according to claim 1,
wherein the lighting device further including a frame, which has a disc shaped flange, and a cylinder like axis projecting at a center of the disc like flange,
wherein the reflecting sheet, the first light guide, the second light guide, and the prism sheet are disposed on the flange in this order, and
wherein the plurality the first LED and the plurality of the second LED are disposed around the axis.

* * * * *